United States Patent
Gardner

(10) Patent No.: US 7,724,637 B2
(45) Date of Patent: May 25, 2010

(54) METHOD AND APPARATUS FOR CONTROLLED SPECTRUM MULTI-CARRIER MODULATION

(75) Inventor: Steven H. Gardner, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 1694 days.

(21) Appl. No.: 10/422,070

(22) Filed: Apr. 21, 2003

(65) Prior Publication Data

US 2004/0125740 A1 Jul. 1, 2004

Related U.S. Application Data

(60) Provisional application No. 60/374,311, filed on Apr. 20, 2002.

(51) Int. Cl.
*H04J 9/00* (2006.01)
*H04J 11/00* (2006.01)
*H04B 7/02* (2006.01)

(52) U.S. Cl. .................... 370/204; 370/208; 370/210; 375/267

(58) Field of Classification Search ......... 370/203–210; 375/260–267

See application file for complete search history.

(56) References Cited

U.S. PATENT DOCUMENTS

| | | | | |
|---|---|---|---|---|
| 5,416,767 | A * | 5/1995 | Koppelaar et al. | 370/210 |
| 6,018,754 | A * | 1/2000 | Chen et al. | 708/316 |
| 6,937,558 | B2 * | 8/2005 | Wakutsu | 370/208 |
| 7,061,854 | B2 * | 6/2006 | Tarokh et al. | 370/206 |
| 7,110,349 | B2 * | 9/2006 | Branlund et al. | 370/203 |

* cited by examiner

*Primary Examiner*—Chi Pham
*Assistant Examiner*—Tri H. Phan
(74) *Attorney, Agent, or Firm*—Jackson Walker L.L.P.; Christopher J. Rourk

(57) ABSTRACT

Disclosed are a method and apparatus for generating a controlled spectrum of modulated energy. A single data stream is splintered into substreams. Each substream is used to modulate a portion of the modulated spectrum. Each substream is transformed into a numerical phase and amplitude representation of a portion of the spectrum to be modulated. The combined numerical representations are then converted to a time-domain representation and filtered to eliminate undesired side-lobes.

18 Claims, 13 Drawing Sheets

METHOD AND APPARATUS FOR CONTROLLED SPECTRUM MULTI-CARRIER MODULATION

RELATED APPLICATIONS

This present application is related to a provisional application Ser. No. 60/374,311 filed on Apr. 20, 2002, entitled "Orthogonal frequency division multiplexed communications with spectrum control", by Gardner, currently pending, for which the priority date for this application is hereby claimed.

FIELD OF THE INVENTION

This invention relates generally to orthogonal frequency division multiplexing; specifically to a controlled spectrum modulation and demodulation means.

BACKGROUND OF THE INVENTION

The ability of electronic systems to carry information is founded on the concept of modulation. Modulation is the act of varying a signal according to information. In the its simplest form, modulation may be the act of pulsing a signal on and off in accordance with digital data. For instance, continuous-wave (CW) radio transmission is literally decoded by sensing the presence or absence of a radio signal. Through the years, modulation techniques have evolved. Amplitude modulation (AM) is a modulation technique that varies the level of a signal according to an information stream. Radio waves can be amplitude modulated by an analog signal allowing them to carry time varying information such as audio or video.

Digital data is now being used to convey all sorts of information. Audio and video can be digitized and then communicated as digital data. Because of the recent trend toward the use of digital data, new modulation techniques have been developed to more effectively convey digital data. Many new modulation techniques are embodied in an apparatus called a "modem". The term modem is an abbreviated acronym for the two terms "modulation" and "demodulation". A modem can modulate a signal according to a stream of data and convey that modulated signal to a remote modem. The remote modem may then demodulate the signal in order to recover the original data stream that was used to modulate the signal.

Some modems now carry significant amounts of data by modulating more than one carrier signal. A digital data stream may be splintered into a plurality of sub-streams. Each sub-stream of data may then be used to modulate a particular carrier. At the receiving end, each carrier can be individually demodulated in order to recover a particular sub-stream of data. Once all of the sub-streams are recovered, a modem may then reconstruct the original data stream and deliver that to a particular destination.

Use of multiple carriers can lead to very complex hardware for either modulation or demodulation. A bank of signal generators would need to be cascaded with a bank of mixers. The resulting plurality of modulated carriers could then be combined and propagated to a remote modem. An equally complex filtering and demodulation circuit would need to be incorporated at the receiving end. The individual carriers would first need to be detected. Once they are detected, they can be demodulated in order to recover a sub-stream of data.

The availability of digital signal processing hardware has led to the refinement of digital modulation techniques. Using these techniques, a stream of digital data may be splintered into sub-streams. Each sub-stream of data may then be converted into a complex sample resulting in a frequency-domain, numerical representation of a modulated signal. By combining the complex samples derived from the individual sub-streams streams of data and then converting the samples into an analog signal, a plurality of individually modulated carriers may be generated. This is typically achieved by applying a numerical inverse-Fourier transformation of the samples into a time-domain numerical representation. The time-domain representation of the modulated carriers may then be converted into an analog signal using a digital-to-analog converter (DAC).

One problem with using multiple digitally synthesized carriers lies in the modulation shaping of the represented signals. Traditionally, time-domain representations of a modulated carrier have been defined using square-shaped pulses. The numerical representations of these modulated carrier signals exhibit a sin x/x response. As a consequence of this, the primary carrier is normally enveloped by exponentially decaying aliases, or side-lobes.

In order to ensure that the side-lobes of one carrier do not interfere with another carrier, the carrier frequencies may be selected so as to cause the carrier center frequency to coincide with the nulls in the other carriers and their sin x/x side-lobes. This frequency selection technique is called orthogonal selection. The method of splintering a data stream into a plurality of modulated carriers is called frequency division multiplexing. When used with orthogonal frequency selection, this type of modulation technique is called orthogonal frequency division multiplexing (OFDM).

The orthogonal frequency selection used in OFDM modulation is not entirely effective in preventing cross-carrier interference. Some energy from adjacent carriers may corrupt data carried by any particular carrier. This is especially true where the sampling frequencies used to convert analog signals into digital representations are not properly matched with the sampling frequencies used to generate the analog signal from a digital representation. In order to avoid this type of data corruption, the data carrying bandwidth of any particular carrier may be reduced. This means that the amount of data that could otherwise be carried by a plurality of carriers may need to be reduced to promote reliable signal transmission.

One very attractive alternative to reducing data bandwidth would be to eliminate, or at least attenuate any side-lobe artifacts resulting from the square shaped modulating pulse and its resultant sin x/x frequency-domain response. To do so would require that each modulated carrier be band-pass filtered to attenuate the side-lobes prior to conveying the carriers to a communications medium. The problem with such an implementation is the complexity of the analog filters that must be introduced into the signal path of the plurality of carriers used in multi-tone modems. Additional advantage could also be realized if a receiving modem could selectively isolate each carrier by first filtering out any spurious energy from the carrier pass-band. This, too, requires complicated hardware that is not only costly, but also generally unstable over time and temperature.

The ability of communication systems to carry information is founded on the concept of modulation. Modulation is the act of varying a signal according to information. In its simplest form, modulation may be the act of pulsing a signal on and off in accordance with digital data. Through the years, modulation techniques have evolved. Amplitude modulation (AM) is a modulation technique that varies the level of a signal according to an information stream. Radio waves can be amplitude modulated by an analog signal allowing them to carry time varying information such as audio or video.

Digital data is now being used to convey all sorts of information. Audio and video can be digitized and then communicated as digital data. New modulation techniques have been developed to more effectively convey digital data. Many new modulation techniques are embodied in an apparatus called a "modem". The term modem is an abbreviated acronym for the two terms "modulation" and "demodulation". A modem can modulate a signal according to a stream of data and convey that modulated signal to a remote modem. The remote modem may then demodulate the signal in order to recover the original data stream that was used to modulate the signal.

The bandwidth required to carry a modulated signal is typically proportional to the rate at which information is transmitted via that signal. Most modulation techniques work best when the channel over which the signal is transmitted introduces the same amount of attenuation at all frequencies, and also when the delay introduced by the channel is the same for all frequencies. When this is not true, the modem receiver implementation may require an equalizing filter that reverses the effect of the channel, so that the composite of the equalizer and the channel have the same attenuation and delay at all frequencies. Often the channel characteristics are not known until the signal is applied to the channel, in which case an adaptive equalizer is required that automatically adjusts to the channel characteristics. Equalizers generally add substantial expense to a modem implementation and they typically do not perform ideally, so that modem performance is to some extent compromised.

An approach that has become commonplace in the past 20 years to simplify the requirements of the equalizer is to use multi-carrier modulation (MCM). The principle behind MCM is that, rather than using a single high-rate modem whose signal occupies a wide bandwidth, a communication system splinters a high-rate data stream into some number of lowerrate data streams, also known as "substreams". These lower-rate data substreams are used to modulate some number of corresponding carrier signals. In effect, each of these low-data-rate modulated carrier signals is a modem that occupies a much narrower bandwidth than a single, high-rate modem. The aggregate data rate of all these low-rate modems is made equal to that of the single high-rate modem. The advantage of using MCM is that the amount of variation in the attenuation and delay of the channel is typically much smaller over any narrow segment of bandwidth than it is over a broad section of bandwidth, so that if the rate of each of the low rate modems is low enough, an equalizer may not be needed at all.

If implemented in a brute force fashion, use of multiple carriers can lead to very complex hardware for either modulation or demodulation. A bank of signal generators would need to be cascaded with a bank of mixers. The resulting plurality of modulated carriers could then be combined and propagated to a remote modem. An equally complex filtering and demodulation circuit would need to be incorporated at the receiving end. The individual carriers would first need to be detected. Once they are detected, they can be demodulated in order to recover a substream of data.

It is well known in the art that the implementation of multi-carrier modems can be greatly simplified through the use of the Inverse Fast Fourier Transform (IFFT) at the transmitter and the Fast Fourier Transform (FFT) at the receiver. A stream of digital data at rate R may be splintered into N substreams, potentially of differing rates but with an aggregate rate of R. The bits in each substream of data may then be converted into a stream of complex samples corresponding to the constellation point (which may include either phase or amplitude information or both) used to modulate the carrier for that stream. When enough data has been input to the transmitter to form a constellation point for every carrier to be used by the transmitter, an IFFT is used to convert the set of constellation points into a set of time domain samples. These samples are then passed one at a time to a digital to analog converter (DAC), producing an analog waveform for transmission.

In some applications, it may be necessary that a communication channel can be used by multiple pairs of modems operating at the same time but using different frequencies, a technique called Frequency Division Multiplexing (FDM). For FDM to make efficient use of the available spectrum, the modulation system must have two characteristics. The first of these characteristics is that the transmitter must confine its transmitted signal to the greatest extent possible to the minimum bandwidth that it needs for reliable communication. Any energy that the transmitter produces in the band that another modem pair is attempting to use will create interference to the communication between those modems.

The second characteristic is that the modem receiver must be able to reject signals that lie outside of the bandwidth occupied by the signal it is trying to receive. Any energy from a modem pair operating in a different frequency band that is not rejected by the receiver will interfere with the receiver's ability to reliably receive the data intended for it. Typically both the transmitter and the receiver issue are addressed by the application of filtering for spectral containment at the transmitter and filtering for selectivity at the receiver. For example, in single carrier systems such as satellite communications, it is common practice in the art to use a Root Raised Cosine digital filter at both the transmitter and the receiver. The RRC filter typically requires some amount of excess bandwidth—that is extra bandwidth beyond the minimum theoretically achievable bandwidth—but the filter can provide outstanding spectral containment and selectivity.

The performance requirements relative to these two characteristics become even more difficult when the system includes a "near/far" scenario. In the near far scenario, a receiving modem is attempting to recover data from a transmitter whose signal encounters substantial attenuation on its propagation path (which is sometimes, but not always, the result of the signal having to travel a long distance—hence the term "far") at the same time that a second transmitter is operating on a different frequency but whose propagation path to the receiving modem exhibits relatively small attenuation (possibly because it is physically near to the receiving modem). In this case, the required attenuation of the transmitter out of band emissions is increased by an amount equal to the path loss imbalance that exists between the two propagation paths. Similarly the requirement for receiver selectivity is also increased by the same amount. In systems where there can be 40 to 50 dB of path loss imbalance, supporting modulations that require SNR on the order of 30 to 40 dB requires out of band emissions that are 70 to 90 dB down, with similar requirements for receiver selectivity.

When used in an FDM application, a problem with using multiple digitally synthesized carriers has been that cost effective methods for application of the sorts of filter techniques used in single carrier modems have not been known. In a single carrier modem, the filter is most commonly placed prior to the mixer that converts the baseband sample stream to its carrier frequency. The analogous position in an IFFT based MCM transmitter is prior to the IFFT, but this does not work because to use filter requires an increase in the sample rate that is incompatible with the operation of the IFFT. The complementary problem exists on the receiver side. Thus in the prior art it has seemed that to implement MCM with filtering would require that the design use a brute force approach to implementing all the carriers and forego the simplification provided by use of the IFFT/FFT.

In the absence of filtering, each carrier is modulated by a train of rectangular time domain pulses. The resulting spectrum on each carrier exhibits a sin(x)/x response. Similarly, the receiver filter also has a sin(x)/x response. This shape is unacceptable in any system that requires good spectral containment in the transmitter and good selectivity in the receiver because its spectral skirts fall off only as the reciprocal of the frequency separation from the band edge.

MCM systems without filtering have still proved to be very useful because the carrier frequencies may be selected so as to cause the carrier center frequency to coincide with the nulls in the other carriers and their sin x/x side-lobes. This allows the receiver to recover the data used to modulate each carrier because at each exact carrier frequency all the interference from all the other carriers goes to zero. This frequency selection technique produces a version of MCM that is called often called Orthogonal Frequency Division Multiplexing, or OFDM The orthogonal frequency selection used in OFDM modulation is not entirely effective in preventing cross-carrier interference. Some energy from adjacent carriers may corrupt data carried by any particular carrier. This is especially true when the delay of the channel is not the same at all frequencies across the band. In order to avoid this type of data corruption, the data carrying bandwidth of any particular carrier may be reduced. This means that the amount of data that could otherwise be carried by a plurality of carriers may need to be reduced to promote reliable signal transmission. Moreover, it is not possible to have an independent second transmitter operating on a different set of carriers and also using OFDM with rectangular pulse shaping, because any frequency and timing difference between the two transmitters will shift the carriers so that the property wherein all potentially interfering carriers have nulls at the desired carrier frequencies.

SUMMARY OF THE INVENTION

What is needed, then, is a means of enhancing OFDM modulation by attenuating side-lobe modulation artifacts such as the sin x/x response associated with square pulses used to represent the carriers. Before the modulated analog signal is conveyed to a remote modem, it should somehow be filtered to attenuate these artifacts. Likewise, a receiving modem may be made more selective if each carrier is pre-filtered in order to remove unwanted components from the pass-band of interest. The present invention provides these features without the complex analog circuitry that would normally be required either in the post-modulation section of a transmitter or in the pre-demodulation section of a receiver.

The present invention comprises a method for attenuating side-lobes from each of a plurality of modulated carriers by applying a digital filter bank to the digital representation of the plurality of modulated carriers before they are converted into an analog signal. The present invention also comprises the use of a digital filter bank for attenuating unwanted energy from a pass-band of interest for each of a plurality of modulated carriers after an analog signal imparted with those carriers is converted into digital data.

According to one illustrative method of the present invention, a data stream may first be splintered into sub-streams of data. Each of these sub-streams of data may then be used to create numerical representations of a plurality of carriers modulated according to each sub-stream of data. Typically, this numerical representation of a plurality of modulated carriers exists in the frequency-domain. This example method of the present invention provides for transforming the numerical representation into the time-domain. Once a time-domain digital representation is created, it may be subjected to a digital filter bank. The digital filter bank typically attenuates the side-lobes from each of the modulated carriers comprising the digital representation. According to this illustrative method, the digital representation may then be converted into an analog signal. This analog signal may then be conveyed to a remote modem.

In one alternative method of the present invention, the time-domain numerical representation of a plurality of modulated carriers may be organized as a sample set. This sample set may then be replicated to form a wide filtering window. Each replica of the sample set may then be weighted according to a filtering coefficient. According to yet another example method of the present invention, the weighting coefficients may be selected to form a root-raised-cosine filter centered at each carrier frequency. Once the filtering window is weighted, it is typically added to a previously generated output window. The output window typically comprises a first-in-time position that is shifted out to form an analog signal. The output window also typically comprises a last-in-time position that is filled with zeros as the first-in-time position is shifted out. In one alternative method, the frequency-domain representation of a modulated carrier may be adjusted in phase and amplitude according to a particular sub-stream of data. This is typically known as quadrature amplitude modulation.

In yet another alternative method illustrative of the present invention, transformation of the numerical representation of a plurality of modulated carriers into the time-domain may be accomplished through an inverse Fourier transform. In one embodiment of this method, a fast inverse-Fourier transform may accept K samples of a modulated carrier and generate K samples of the modulated carrier in the time-domain.

One alternative example method of the present invention provides for receiving a digital data stream by first converting an analog signal into digital samples. A digital filter bank may then be used to select a frequency band from the digital samples to form a time-domain representation of a modulated carrier. The time-domain representation of the modulated carrier may then be transformed into a frequency-domain sample set. The frequency-domain sample set may then be demodulated in order to recover a data sub-stream. According to this illustrative method, a plurality of sub-streams may then be combined to form a data stream.

In one illustrative method of the present invention, digital samples of an analog signal may be organized into a filtering window. This filtering window may be weighted by filter coefficients. According to one example method of the present invention, the filter coefficients may define a root-raised-cosine filter response. Once the filtering window is weighted, it may then be fragmented into sample sets. The sample sets may then be summed together and the sum may then be transformed into a frequency-domain numerical representation of a plurality of modulated carriers. Sub-streams of data may then be extracted from the numerical representation of each modulated carrier. One example method of the present invention further provides for combining sub-streams of data to form a digital data stream. Akin to the method for transmitting a data stream, the step of transforming the sum of the sample sets formed from the filtering window may be performed by a Fourier transform of K points. A fast Fourier transform may be used.

The present invention also comprises a data communications device comprising a splintering unit, an encoder, a transformer, a digital filter bank, and a digital to analog converter. According to one illustrative embodiments of a data communications device commensurate with the teachings of the present invention, the splintering unit receives a stream of digital data and may generate a plurality of sub-streams of data. The encoder may then receive the sub-streams of data to create numerical representations of a plurality of carriers that are modulated according to the sub-streams of data. The transformer may then transform the numerical representation of the plurality of modulated carriers into a time-domain sample set. According to this embodiment, the digital filter bank may then be used to attenuate side-lobes from each carrier that may be present in the time-domain sample set. The digital to analog converter may then generate an analog signal from the filtered time-domain sample set.

The present invention may also comprise a data transmitter. The data transmitter may comprise a splintering unit, an encoder, a transformer, a replicator, a multiplier, a weighted waveform register, an adder, and an output register. According to this illustrative embodiment of a data transmitter, the splintering unit may receive a stream of digital data and generate a plurality of sub-streams. The encoder may then receive the sub-streams of data to create numerical representations of a plurality of carriers modulated according to the sub-streams of data.

According to this example of embodiment of the present invention, the transformer accepts numerical representations of a plurality of modulated carriers and transforms these into a time-domain sample set. The replicator creates copies of the sample set to fill the filtering window register. The multiplier multiplies each copy of the time-domain sample set by a pre-established corresponding coefficient and stores this product in the weighted waveform register. The adder may then add the value stored in the output register to the value stored in the weighted waveform register and then store the sum back into the output register. The output register receives the sum from the adder and shifts out a time-domain sample set corresponding to the first-in-time position of the output register. This sample set may then be used in some embodiments of the present invention to drive a digital to analog converter in order to generate an analog signal according to the time-domain sample set shifted out from the output register. As the output register shifts out its first-in-time sample set, the last-in-time sample set position is typically filled with zeros.

In one alternative embodiments of the present invention, the encoder comprises a quadrature amplitude-phase (QAM) modulator. The QAM modulator typically creates a frequency-domain representation of the carrier signal and adjusts this representation according to the phase and amplitude of a sub-stream of data. In yet another alternative embodiments of the present invention, the transformation unit comprises an inverse fast-Fourier transform embodied in a signal processor. This inverse fast-Fourier transform typically accepts K samples representing a modulated carrier and generates a time-domain sample set comprising K samples. In another illustrative embodiment of the present invention, the pre-established filter coefficients may define a root-raised-cosine filter.

The present invention also comprises a data receiver. The data receiver typically comprises an analog to digital converter, a digital filter bank, a transformation unit, a decoder, and a data combiner. Accordingly, an analog signal may be converted into digital samples by the analog to digital converter. The digital filter bank may then select a frequency band from the digital samples to form a time-domain representation of a modulated carrier. The transformation unit may then convert the time-domain representation of the modulated carrier into a frequency-domain sample set. According to this illustrative embodiment, the decoder may receive the frequency-domain sample set to extract a sub-stream of data therefrom. The data combiner may then combine a plurality of data sub-streams into a single data stream that can be delivered to a particular destination.

The present invention also comprises an alternative embodiment of a data receiver. In this alternative embodiment, the data receiver comprises an analog to digital converter, a filtering window, a multiplier, a fragmentation unit, an adder, a transformation unit, a decoder and a combiner. According to this illustrative embodiment, the analog to digital converter receives an analog signal and creates digital data samples that are stored in the filtering window. The multiplier multiplies the contents of the filtering window by a filter coefficient. According to one example embodiment of the invention, the filter coefficient may define a root-raised-cosine filter response. Once the filtering window has been weighted by the filter coefficient, its contents may be fragmented by the fragmentation unit into a plurality of sample sets.

The adder may then sum the plurality of sample sets together and pass that sum to the transformation unit. The transformation unit may then transform the sum of the sample sets into a frequency-domain representation of a plurality of modulated carriers. The decoder may then extract a sub-stream of data from a particular modulated carrier. The combiner may then combine sub-streams of data into a data stream. According to one alternative embodiment of the invention, the transformation unit may comprise a Fourier transform signal processor. The fragmentation unit fragments the filtering window into sample sets compatible with the Fourier transform signal processor. Said signal processor may implement a fast Fourier transform.

To enable the use of frequency division multiplexing in systems using multi-carrier modulation, a cost effective means is needed to provide substantial attenuation of out of band emissions associated with the sin(x)/x response of traditional OFDM transmitters. Ideally, this method should be flexible so that different subsets of the set of tones available to carry data may be used and the needed out of band emissions is achieved without requiring a different filter architectures or filter coefficients.

Likewise, a similar cost effective means is needed to provide substantial improvement in receiver selectivity by attenuating the receiver response to signals outside of the desired band. As is the case with the transmitter, the method used in the receiver should also include flexibility that allows the use of different subsets of the tones in the set of tones available to carry data without requiring different filter architectures or different filter coefficients for each subset.

The present invention provides these features in both the transmitter and receiver in a simple, cost effective way that requires no change in filter design regardless of the subset of tones that are selected.

The present invention comprises a method for attenuating side-lobes from each of a plurality of modulated carriers by applying a digital window to the digital reprentation of the plurality of modulated carriers before they are converted into an analog signal. The present invention also comprises the use of a digital window for attenuating unwanted energy outside of a pass-band of interest for each of a plurality of modulated carriers after an analog signal imparted with those carriers is converted into digital data.

According to one illustrative method of the present invention, a data stream to be transmitted may first be demultiplexed into substreams of data. Each of these substreams of data may then be used to create numerical representations of the phase and amplitude used to modulate each of a plurality of carriers according to each substream of data. Typically, the numerical representations of the phase and amplitude used to modulate all the carriers are equivalent to the frequency domain representation of the plurality of carriers during a modulation symbol time, with a given phase and amplitude representing the phase and amplitude of the signal at the frequency of the corresponding carrier. This example method of the present invention provides for implementing the modulation of the plurality of carriers simultaneously using a technique that transforms the numerical representations from the frequency domain into a time-domain sample set. Once a time-domain digital representation is created, it may be processed by a digital filter window. The digital filter window typically attenuates the side-lobes from each of the modulated carriers comprising the digital representation. According to this illustrative method, the digital representation may then be converted into an analog signal. This analog signal may then be transmitted over a channel to the demodulator in a remote modem.

In one alternative method of the present invention, the time-domain numerical representation of a plurality of modulated carriers may be organized as a sample set. This sample set may then be replicated multiple times to form an input to a filtering window. Each replica of the sample set may then be weighted according to a filtering window coefficient, where the set of windowing coefficients determine the characteristics of the spectrum of the signal to be transmitted. According to yet another example method of the present invention, the weighting coefficients may be selected so that the effect of the filter is to form root-raised-cosine filters centered at each carrier frequency. Once the input to the filtering window is weighted, it is typically added sample-by-sample to the contents of a previously generated output sample shift register. At each update of the output sample shift register, a plurality of samples is typically shifted out of the first-in-time position of the shift register and converted to an analog signal. As each sample is shifted out of the first-in-time position of the shift register, zero-valued samples are entered into the last-in-time position of the shift register.

In one alternative method, the numerical representations of the phase and amplitude used to modulate each carrier may be achieved by mapping the data substream to phase and amplitude relative to a fixed phase and amplitude reference. This is typically referred to as Quadrature Amplitude Modulation (QAM).

In another alternative method the numerical representations of the phase and amplitude used to modulate each carrier may be achieved by mapping the data substream to changes in phase relative to the phase used to modulate the carrier for the previous symbol time. This is typically referred to as Differential Phase Shift Keying (DPSK) modulation.

In yet another alternative method the numerical representations of the phase and amplitude used to modulate each carrier may be achieved by mapping the data substream to changes in phase and amplitude relative to the phase and amplitude used to modulate the carrier for the previous symbol time. This is typically referred to as Differential Amplitude and Phase Shift Keying (DAPSK) modulation.

substream

In yet another alternative method illustrative of the present invention, transformation of the numerical representation of a plurality of modulated carriers into the time-domain may be accomplished through an inverse Discrete Fourier Transform (DFT). In one embodiment of this method, the inverse DFT may be implemented as a Fast Fourier Transform (FFT). The Fast Fourier transform may accept K samples of a modulated carrier and generate K samples of the modulated carrier in the time-domain.

One alternative example method of the present invention provides for receiving a digital data stream generated by the transmitter method described previously. A digital windowing module may be used in combination with a DFT or FFT to form an approximation of the numerical representation of the phase and amplitude used to modulate the carrier in the transmitter. substream According to this illustrative method, a plurality of substreams may then be combined to form a data stream.

In one illustrative method of the present invention, digital samples may be organized into a filtering window, typically by shifting the digital samples into the last-in-time position in a shift register. This filtering window may be weighted by filter coefficients by multiplying each sample in the shift register by a corresponding filter coefficient weight. According to one example method of the present invention, the filter coefficients may define a root-raised-cosine filter response. Once the filtering window is weighted, it may then be fragmented into a plurality of sample sets having equal numbers of samples. The sample sets may then be summed together on a sample-by-sample basis to form a single sample set sum and the sum may then be transformed into a frequency-domain numerical representation of the phase and amplitude of a plurality of modulated carriers. Substreams of data may then be extracted from the numerical representation of the phase and amplitude of each modulated carrier. One example method of the present invention further provides for multiplexing substreams of data to form a digital data stream. Akin to the method for transmitting a data stream, the step of transforming the sum of the sample sets formed from the filtering window-may be performed by a Discrete Fourier Transform of K points. A Fast Fourier Transform may be used.

In yet another illustrative method of the present invention, the digital samples input to the The present invention also comprises a data communications device comprising a demultiplexing unit, an encoder, a transformer, and a digital windowing module. According to one illustrative embodiment of a data communications device commensurate with the teachings of the present invention, the demultiplexing unit receives a stream of digital data and may generate a plurality of substreams of data. The encoder may then receive the substreams of data to create numerical representations of the phase and amplitude used to modulate a plurality of carriers according to the substreams of data. The transformer may then transform the numerical representation of the phase and amplitude used to modulate the plurality of carriers into a time-domain sample set. According to this embodiment, the digital window may then be used to attenuate side-lobes from each carrier that may be present in the time-domain sample set.

A digital to analog converter may then generate an analog signal from the filtered time-domain sample set.

The present invention may also comprise a data transmitter. The data transmitter may comprise a demultiplexing unit, an encoder, a transformer, a replicator, a filtering window register, a multiplier, a weighted waveform register, an adder, and an output register. According to this illustrative embodiment of a data transmitter, the demultiplexing unit may receive a stream of digital data and generate a plurality of substreams.

The encoder may then receive the substreams of data to create numerical representations of the phase and amplitude used to modulate a plurality of carriers according to the substreams of data.

According to this example of embodiment of the present invention, the transformer accepts numerical representations of the phase and amplitude used to modulate the plurality of carriers and transforms these into a time-domain sample set. The replicator creates copies of the sample set to fill the filtering window register. The multiplier receives copies of the time domain sample set and multiplies each copy sample-by-sample by a pre-established corresponding coefficient to generate a weighted waveform. The weighted waveform is stored in the weighted waveform register. The adder may then add the value stored in an output register to the value stored in the weighted waveform register and then store the sum back into the output register. The output register receives the sum from the adder and shifts out a time-domain sample set corresponding to the first-in-time position of the output register and inserts zero valued samples into the last-in-time position of the output register. This sample set may then be used in some embodiments of the present invention to drive a digital to analog converter in order to generate an analog signal according to the time-domain sample set shifted out from the output register.

In one alternative embodiments of the present invention, the encoder comprises a quadrature amplitude-phase (QAM) modulator. The QAM modulator typically maps the data in each substream into a phase and amplitude for the corresponding carrier.substream In another embodiment of the present invention, the encoder comprises a differential phase shift keying (DPSK) modulator. The DPSK modulator typically maps the data in each substream into a change in the phase of the corresponding carrier. In another embodiment of the present invenetion, the encoder comprises a differential amplitude and phase shift keying (DAPSK) modulator. The DAPSK modulator typically maps the data in each substream into a change in the phase and amplitude of the corresponding carrier. Alternatively, the DAPSK modulator may map the data in each substream into a change in phase and a specific amplitude based on the data.

In another alternative embodiment of the present invention, the modulation used by the encoder for each of the plurality of carriers may be chosen independently, so that different carriers are modulated using different modulations. In this embodiment of the present invention, the choice of modulation used for each carrier is made based on an estimate of the channel quality in the frequency band occupied by that carrier.

In another embodiment of the present invention, the encoder operation may include Forward Error Correcting Encoding (FEC). The FEC may include interleaving.

In yet another alternative embodiments of the present invention, the transformation unit comprises an inverse Fast-Fourier Transform embodied in a signal processor, which may be implemented either in software or hardware or a combination of the two. This inverse Fast-Fourier Transform typically accepts K samples representing a modulated carrier and generates a time-domain sample set comprising K samples. In another illustrative embodiment of the present invention, the pre-established filter coefficients may define a root-raised-cosine filter.

The present invention also comprises a data receiver for demodulating a digital sample stream representing a signal modulated with multicarrier modulation in which the individual carriers have been filtered for spectral containment purposes. The data receiver typically comprises a digital windowing module, a transformation unit, a decoder, and a data multiplexer. Accordingly, the digital sample stream is input to the digital windowing module, which attenuates received energy outside of the band occupied by each of the plurality of carriers in the input time domain sample set. The transformation unit may then convert the time-domain representation output by the digital windowing module into a numerical representation of a receiver estimate of the phase and amplitude used to modulate a plurality of carriers by the transmitter. According to this illustrative embodiment, the decoder may the receiver estimate sample set and extract a substream of data therefrom. The data multiplexer may then combine a plurality of data substreams into a single data stream that can be delivered to a particular destination.

The present invention also comprises an alternative embodiment of a data receiver for demodulating a digital sample stream representing a signal modulated with a multicarrier modulation in which the individual carriers have been filtered for spectral containment or other purposes. In this alternative embodiment, the data receiver comprises a filtering window shift register, a multiplier, a fragmentation unit, an adder, a transformation unit, a decoder and a combiner. According to this illustrative embodiment, the received digital data samples are shifted into in the filtering window shift register. The multiplier multiplies the contents of the filtering window by a filter coefficient on a sample-by-sample basis. Once the contents of the filtering window shift register have been weighted by the filter coefficients, the result may be fragmented by the fragmentation unit into a plurality of sample sets.

The adder may then sum the plurality of sample sets from the fragmentation unit together on a sample-by-sample basis and pass that sum to the transformation unit. The transformation unit may then transform the sum of the sample sets into a numerical representation of the receiver estimate of the phase and amplitude used to modulate the plurality of carriers by the transmitter. The decoder may then extract a substream of data from a particular modulated carrier. The combiner may then combine substreams of data into a data stream. According to one alternative embodiment of the invention, the transformation unit may comprise a Discrete Fourier Transform (DFT). The DFT may be implemented using the Fast Fourier Transform algorithm. The decoder extracts substreams of data from the numerical representations of the receiver estimates of the phase and amplitude used to modulate the plurality of carriers by the transmitter. The combiner multiplexes the substreams of data into the receiver estimate of the data stream transmitted by the modulator.

In an alternative embodiment of the present invention, the pre-established weighting coefficients may define a root-raised-cosine response. The pre-established weighting coefficients may also approximate a time domain response that is matched to the transmitter filter. The pre-established weighting coefficients may also be selected so that the convolution of the transmitter and receiver filter impulse response satisfies the Nyquist criterion for zero intersymbol interference at the ideal sampling instance.

In yet another alternative embodiment of the present invention, the fragmentation unit fragments the product from the multiplier into sample sets of K sample each, wherein K is equal to the number of points provided to the Discrete Fourier Transform used to transform a sum of the sample sets into a numerical representation of the receiver estimate of the phase and amplitude used to modulate each of the plurality of carriers by the transmitter.

BRIEF DESCRIPTION OF THE DRAWINGS

The foregoing aspects are better understood from the following detailed description of one embodiment of the invention with reference to the drawings, in which.

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
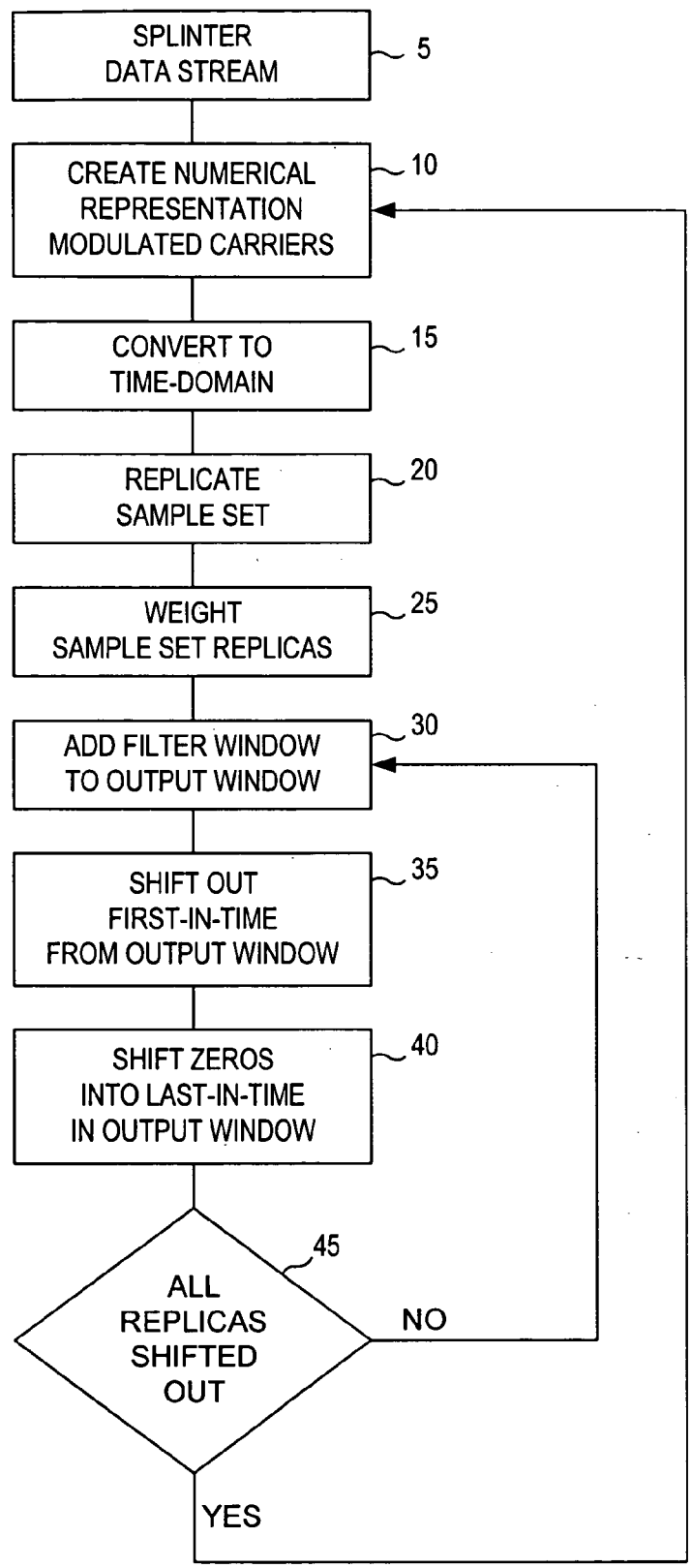
FIG. 1 is a flow diagram of one illustrative process for generating a spectrum controlled OFDM carrier suite.

The present invention comprises a method for transmitting data using OFDM modulation that is enhanced with spectral control features. In one embodiment of this invention, a method is provided for modulating carriers according to data wherein each carrier is subjected to filtering by a digital filter bank. This method results in an analog signal comprising a plurality of modulated carriers wherein each carrier may have side-lobes that are attenuated. The method of the present invention also comprises a process for receiving a plurality of modulated carriers by first subjecting an incoming signal to a digital filter bank. The digital filter bank promotes selection of a carrier to the exclusion of other spurious artifacts that may be present in the signal.

Digital filter banks are not new. Prior teachings of digital filter banks are prevalent in the art and one excellent reference for the design and implementation of digital filter banks is the engineering text entitled "Multirate Digital Signal Processing" by Chrochiere and Rabiner (ISBN No. 0-13-605162-6). Within that text, Chapter 7 provides an excellent teaching with respect to implementation of a digital filter bank as applied to spectrum analysis and is hereby incorporated in its entirety (Chapter 7) into this application by reference. Digital filter banks have been used for spectrum analysis, but no known art has applied these digital filter bank techniques to data communications. The present invention comprises embodiments of digital filter banks that are referred to as weighted overlap-add structures. These structures are fully taught by the referenced text.

OFDM modulation techniques have not incorporated any spectrum control due to the cost, complexity and instability of the analog filtering necessary to attenuate the side-lobes of a modulated carrier. By applying digital filter banks to an OFDM communications system, the problem of controlling the energy composition of a large number of narrow frequency bands can be overcome. With the appropriate choice of digital filter coefficients, digital filter banks can be applied to shaping OFDM modulation and controlling the spectrum of the individual carriers.

In a digital modulation scheme, K samples are input into a modulator at a given time. The sample rate is up-converted by a factor of M and the samples are filtered with the filter $f(n)$. The outputs of the filters are modulated by K equally spaced complex carriers and summed. If the filter bandwidths are less than the carrier spacing, then we have a system that looks like a set of traditional frequency division multiplexed (FDM) modulators.

Up-conversion of the sample rate is required because the bandwidth of the signal represented by the sum of all the channels is much greater than the bandwidth of a single channel. If M is equal to K, then if $f(n)$ is an ideal sample rate conversion filter that removes alias energy completely, we have the minimum carrier spacing required to reproduce the original signals exactly. In this case the system is said to be critically sampled. A more likely scenario is that $f(n)$ requires some excess bandwidth, and then we must have $M=(1+\alpha)K$, where alpha is the excess bandwidth.

Crochiere and Rabiner define filter banks where K=IM, for I some integer. This is contra to the ratio just given because the incorporated text applies filter banks in spectral analysis applications. Accordingly, it is best to over-sample in frequency in order to improve spectral resolution. In the communications application taught here, over-sampling data in essential in order to demodulate carrier signals.

According to the teachings of the present invention, a receiver reverses the transmitter process in order to recover the original samples. It should be apparent that if the carrier spacing is wide enough that the filter shapes don't overlap, and the convolution of the filters $h(n)$ and $f(n)$ satisfies the Nyquist criterion for zero intersymbol interference, that the system is able to make $Y_k(m)$ exactly equal to $X_k(m)$. Thus for example, $h(n)$ and $f(n)$ might be root-raised cosine shapes with an excess bandwidth of 25% or so. This additional bandwidth is illustrative and is not intended to limit the scope of the present invention. The net conclusion is that if the convolution of $f()$ and $h()$ satisfies the Nyquist criterion for zero ISI (that is, $f*h$ is 1 for n=0 and 0 at multiples of the symbol rate), and if in the frequency domain the spectra of the frequency shifted versions of $f*h$ do not overlap at the tone positions, then the desired samples are perfectly recoverable.

FIG. 1 is a flow diagram of one illustrative for generating a spectrum controlled OFDM carrier suite. Generally, a digital data stream may be splintered into sub-streams of data and each sub-stream may then be used to modulate a carrier in the frequency-domain. The carrier may be modulated in any of a number of ways, one of which is QAM modulation. It should be noted that the scope of the present invention should not be limited to any particular modulation technique. Once the modulated carriers are represented in the frequency-domain, they may be transformed into a time-domain sample set. Before these carriers are converted into an analog signal, the general method of the present invention provides for the application of digital filtering in order to attenuate any side-lobes or other artifacts that may be affiliated with the carrier.

According to one illustrative method, a digital filter bank may be applied commensurate with the teachings of Chapter 7 of Crochiere and Rabiner. In one such embodiment, a data stream may be splintered into a plurality of data streams (step 5). These data sub-streams may then be used to generate a numerical representation of a plurality of modulated carriers in the frequency-domain (step 10). The frequency-domain representation of the carriers may then be converted into a time-domain sample set (step 15). The time-domain sample set may then be replicated to fill the width of a filter with a desired filter response duration (step 20). These replications of the sample set may then be weighted with a filter coefficient (step 25). In one embodiment of this illustrative method, the coefficients may define a root-raised-cosine filter.

The method of the present invention provides for a weighted-overlap-add process that implements a digital filter bank. Accordingly, the weighted sample set replicas stored in the filter window are added to an output window (step 30). After the addition is complete, the first-in-time portion of the output window is shifted out (step 35) as zeros are shifted into the last-in-time position of the output window (step 40). This process continues until all of the replicas are shifted out of the output window output (step 45).

Figure 2:
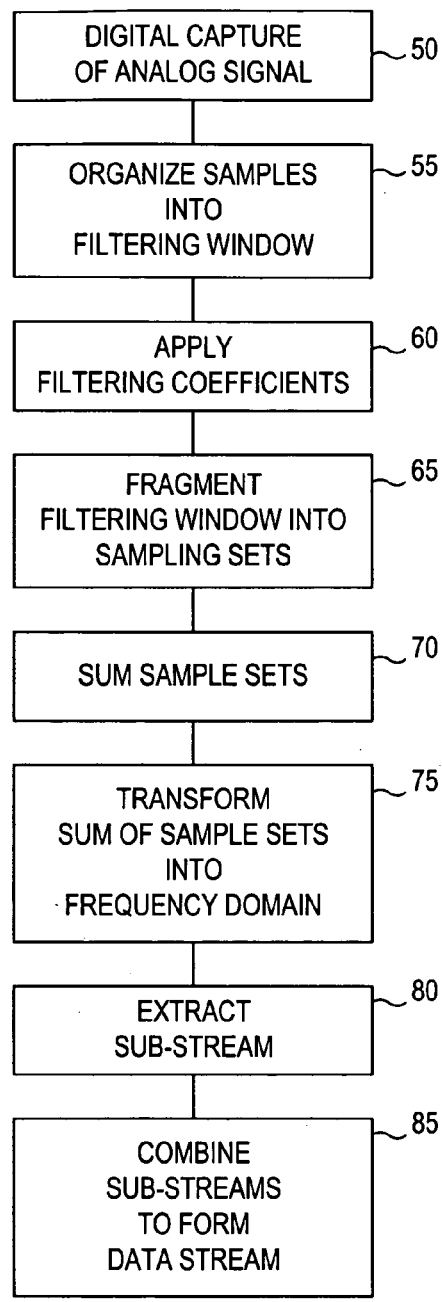
FIG. 2 is with a flow diagram that depicts one of illustrative method for receiving a plurality of OFDM carriers according to the present invention.

FIG. 2 is with a flow diagram that depicts one illustrative method for receiving a plurality of OFDM carriers according to the present invention. A plurality of OFDM carriers may generally be received by converting an analog signal into digital samples. The digital samples may then be subjected to a filtering process that numerically selects a frequency band from the digital samples to form a time-domain representation of the modulated carrier. The time-domain representation of the modulated carrier may then be transformed into a frequency-domain sample set. A data recovery function may then be applied to the frequency-domain sample set to recover a sub-stream of data. According to this general method, the plurality of data sub-streams may be combined to form a data stream.

In one example method, the first step in receiving an OFDM modulated signal is to capture an analog signal as a series of digital samples (step 50). These samples are typically organized into a filtering window (step 55). The number of samples used to populate the filtering window typically comprises a multiple of the number of samples used in a transformation process to convert the samples into a frequency-domain representation of a plurality of modulated carriers. The number of samples may be increased to provide for a specific duration in the response of filters comprising a digital filter bank.

Once the filtering window is fully populated, it may be weighted by multiplying the contents of the filtering window by pre-established coefficients that define a filter response (step 60). In one example method, the pre-established coefficients may define a root-raised-cosine filter response. The filter window may then be fragmented into sampling sets (step 65). The sampling sets may then be summed together (step 70). The sum of the sample sets may then be transformed into a frequency-domain representation of a plurality of modulated carriers (step 75). Data sub-streams may then be extracted from the frequency-domain representation of the modulated carrier (step 80) and combined with other sub-streams extracted from other carriers represented in the frequency-domain sample set (step 85).

Figure 3:
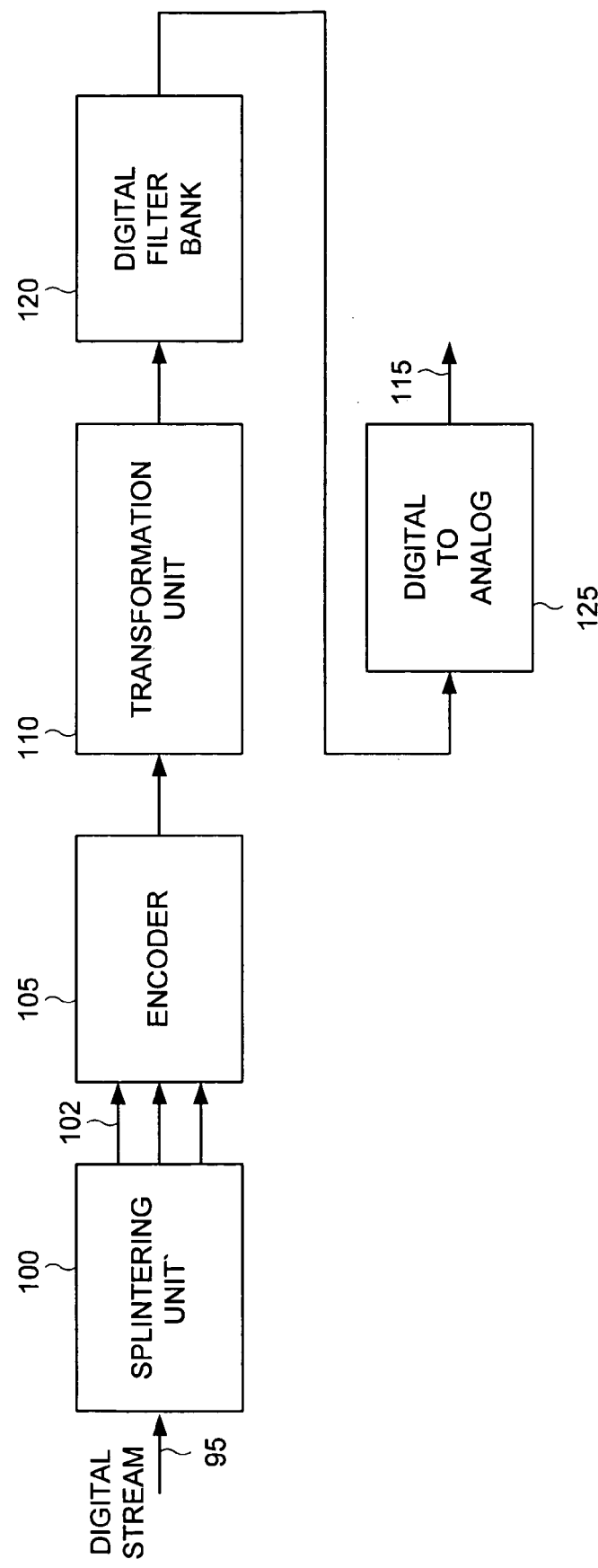
FIG. 3 is a block diagram of one illustrative embodiment of a data communications device employing the methods of the present invention.

FIG. 3 is a block diagram of one illustrative embodiment of a data communications device employing the methods of the present invention. A data communications device may comprise a splintering unit 100 capable of accepting a digital stream of data 95. The data communications device may further comprise an encoder 105, a transformation unit 110, a digital filter bank 120 and a digital to analog converter 125.

In operation, the splintering unit 100 received the digital stream of data 95 and creates a plurality of sub-streams of data 102. A sub-stream of data 102 may then be received by the encoder 105. Typically, the encoder 105 creates a numerical representation of a plurality of carriers modulated according to the various sub-streams of data that it may receive from the splintering unit 100. This numerical representation may be transformed into a time-domain sample set by the transformation unit 110. The time-domain sample set may then be filtered by the digital filter bank 120 in order to attenuate side-lobes that may envelope each carrier represented in the time-domain sample set. A filtered time-domain sample set may then be provided to the digital to analog converter 125. The digital to analog converter 125 generates an analog output signal 115 according to a filtered time-domain sample set that it receives from the digital filter bank 120.

Figure 4:
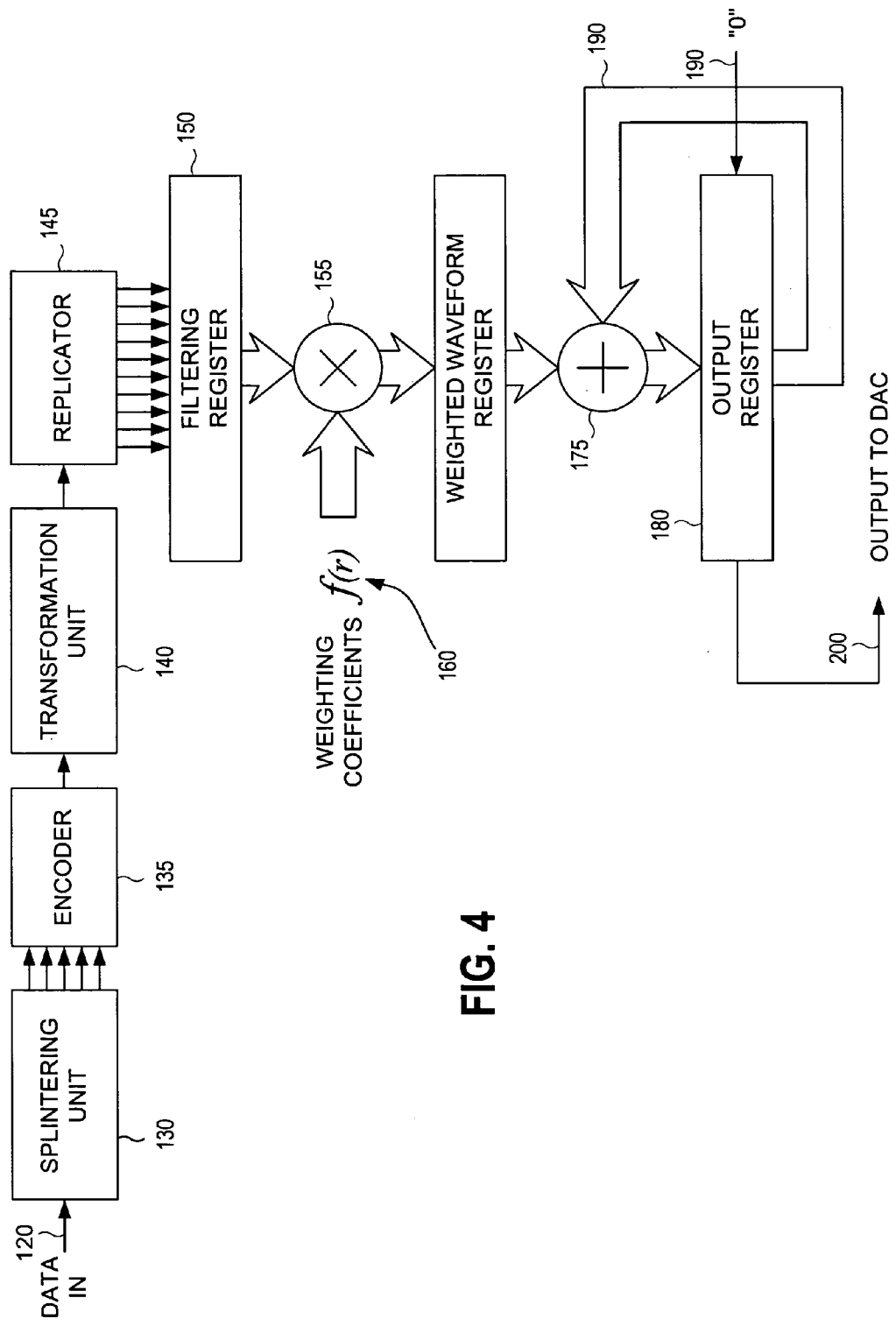
FIG. 4 is a block diagram of one illustrative structure of a data transmitter comprising a weighted overlap-add structure according to the teachings of the present invention.

FIG. 4 is a block diagram of one illustrative structure of a data transmitter comprising a weighted overlap-add structure according to the teachings of the present invention. According to this alternative embodiment, a data stream 127 is partitioned into a plurality of sub-streams of data by a splintering unit 130 that comprises the data transmitter. The data transmitter further comprises encoder 135, a transformation unit 140, a replicator 145, a filtering register 150, a multiplier 155, a weighted waveform register 170, an adder 175, and an output register 180. In some embodiments, the data transmitter may further comprise a digital to analog converter.

The encoder 135 receives a plurality of sub-streams of data and generates a numerical representation of a plurality of carriers. The encoder 135 typically adjusts this numerical representation in accordance with the data represented by the plurality of sub-streams it receives. This enables modulation of the plurality of carriers represented in the numerical representation generated by the encoder 135. In some embodiments, the encoder may adjusts the numerical representation of a carrier in order to vary its phase and/or amplitude according to a sub-stream of data. This may result in a QAM modulation of the numerically represented carrier. It should be noted that the scope of the present invention should not be limited to any one form of modulation that may employed by the encoder.

The transformation unit 140 typically receives a frequency-domain representation of a plurality of modulated carriers from the encoder 135. The transformation unit 140 typically transforms this numerical representation into a time-domain sample set that is provided to the replicator 145. In some embodiments of the present invention, the transformation unit 275 may comprise a signal processor that implements an inverse-Fourier transform. The inverse-Fourier transform function may be implemented as a fast inverse-Fourier transform of K number of samples. The replicator 145 creates a plurality of copies of the time-domain sample set and stores these in a concatenated fashion. The number of copies created by the replicator may be varied in accordance with a desired response duration of filters comprising a digital filter bank. It should be noted that a sample set is the quantum of data samples used by the transformation unit when a frequency-domain representation of a plurality of modulated carriers is transformed into a time-domain representation.

Weighting coefficients 160 are typically pre-established and represent the transfer function of filters comprising the digital filter. In some embodiments, the pre-established coefficients 160 may define a root-raised-cosine filter response. The multiplier 155 applies the weighting coefficients 160 to corresponding replicas of the time-domain sample set stored in the filtering register 150. The weighted result may then be stored in a weighted waveform register 170.

As the weighted overlap-add structure operates, the output of the weighted waveform register 170 is added to the value stored in the output register 180 by the adder 175. The output register 180 may then be shifted causing the sample set in the first-in-time position to be directed to a digital to analog converter 200. As the output register 180 is shifted by one sample set, zeros 195 are shifted into the last-in-time sample set position of the output register 180. The shifted value of the output register 190 is again added to the value stored in the weighted waveform register 170. The new sum is then stored into the output register 180. The shifting and summation process continues until all of the weighted sample sets stored in the weighted waveform register 170 are dispatched as an output 200 that feeds a digital to analog converter.

Figure 5:
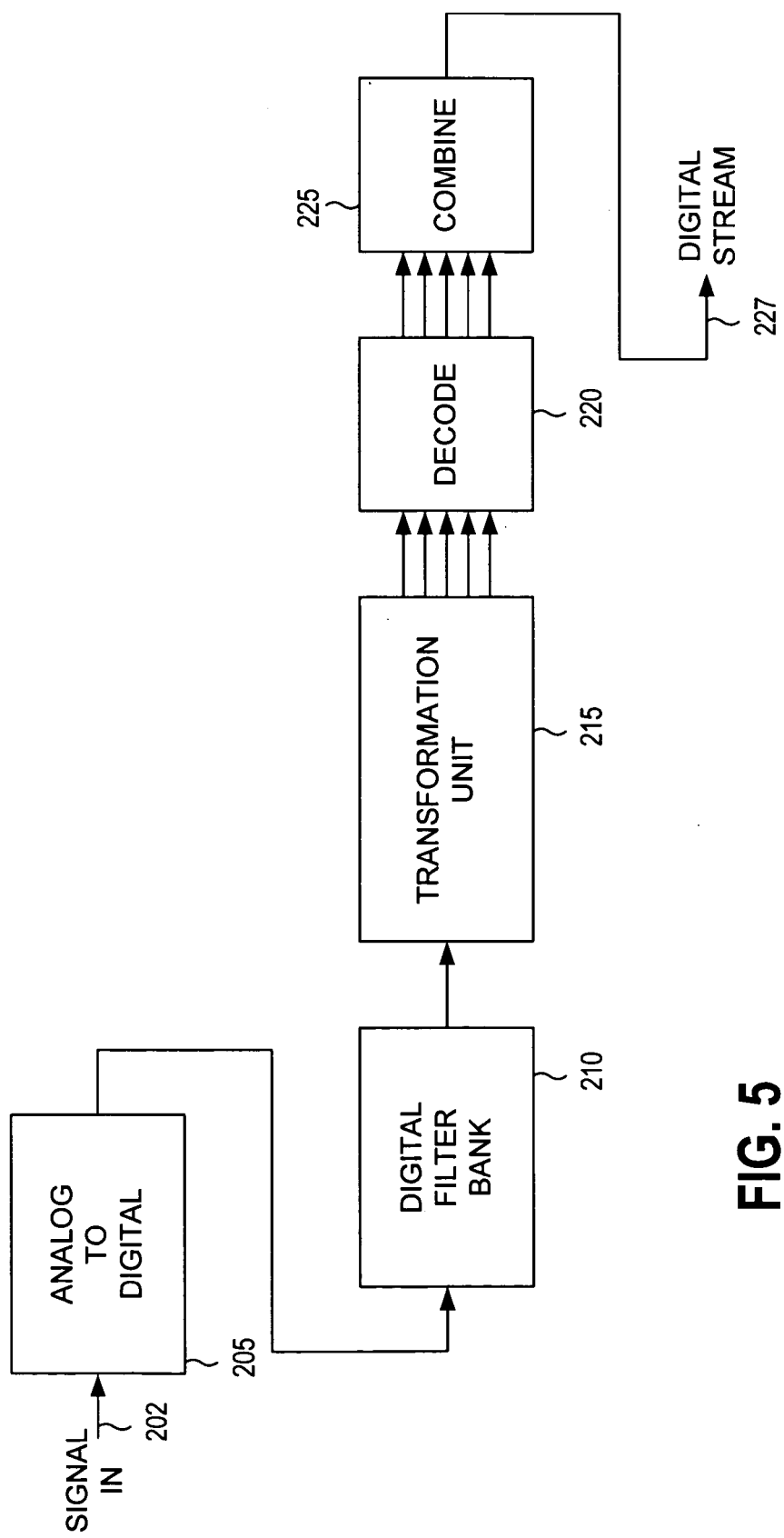
FIG. 5 is a block diagram of one example embodiment of an OFDM receiver employing the methods of the present invention.

FIG. 5 is a block diagram of one example embodiment of an OFDM receiver employing the methods of the present invention. According to this example embodiment, an OFDM receiver may comprise an analog to digital converter 205, a digital filter bank 210, a transformation unit 215, a decoder 220 and a combiner 225. An analog signal 202 carrying a plurality of modulated carriers may be converted into a stream of digital samples by the analog to digital converter 205. These samples may then be directed to the digital filter bank 210.

The digital filter bank selects frequency bands commensurate with the center frequency of carriers that may be present in the numerical representation of the analog signal provided by the analog to digital converter 205. Hence, the digital filter bank attenuates signal components that lie outside each frequency band for each carrier present in the numerical representation of the analog signal. The filtered numerical representation of the analog signal is a time-domain representation of the modulated carriers arriving by way of the analog signal 202. The time-domain representation of the modulated carriers may then be provided to the transformation unit 215. The transformation unit 215 may then transform the time-domain representation into a frequency-domain sample set. The decoder 220 may then extract sub-streams of digital data from the individual carriers represented by the frequency-domain sample set. The combiner 225 may then combined the individual sub-streams of digital data to form an aggregate data stream 227.

Figure 6:
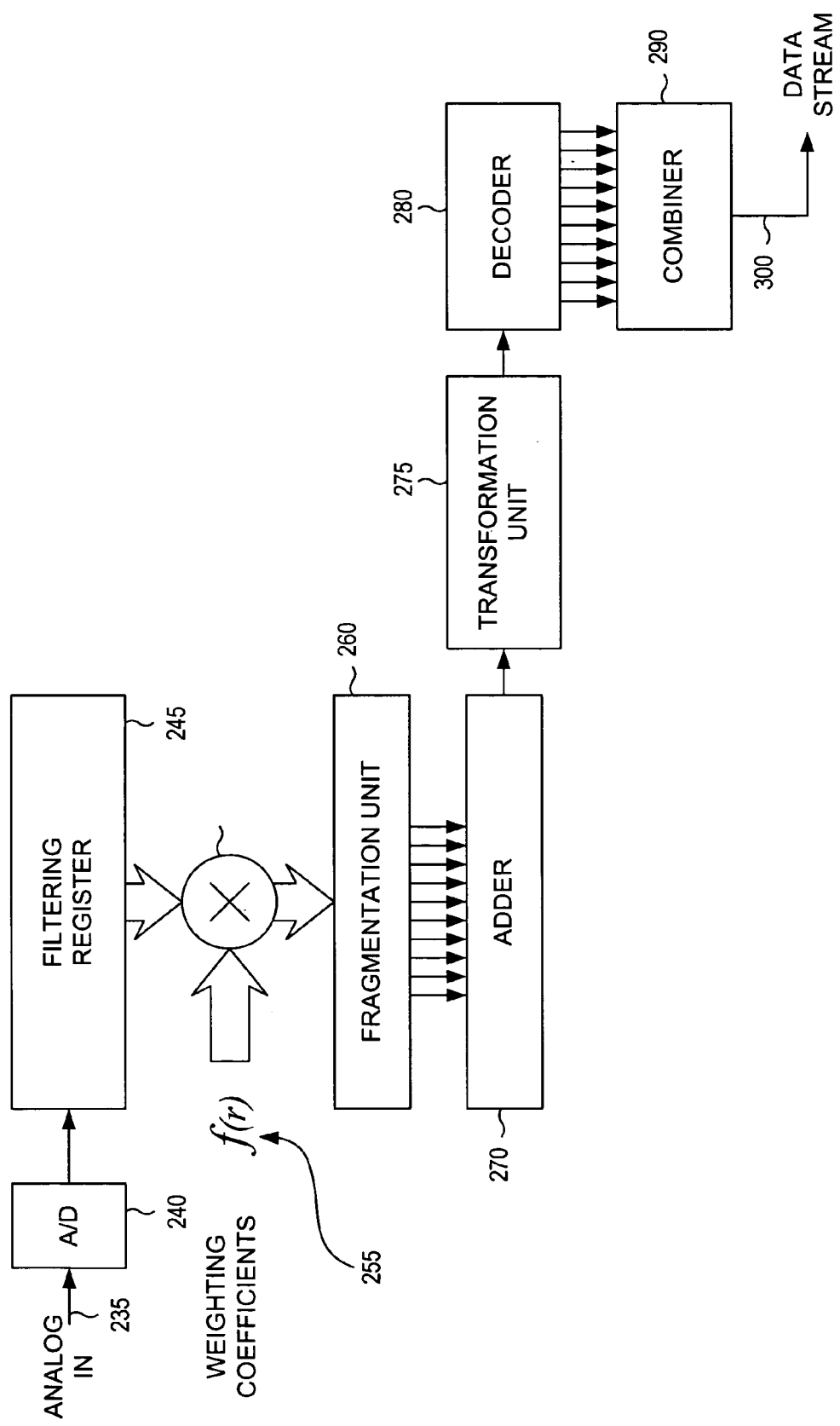
FIG. 6 is a block diagram of one illustrative embodiment of the data receiver comprising a weighted overlap-add structure according to present invention.

FIG. 6 is a block diagram of one illustrative embodiment of the data receiver comprising a weighted overlap-add structure according to present invention. According to this alternative embodiment of a data receiver, an analog signal 235 may be converted into digital samples by an analog to digital converter 240 that comprises the invention. The data receiver further comprises a filtering register 245, a multiplier 250, a fragmentation unit 260, an adder 270, a transformation unit 275, a decoder 280 and a combiner 290.

The filtering register 245 accepts some number of digital samples from the analog to digital converter 240. Typically, the number of samples received by the filtering register is a multiple of the number of samples used by the transformation unit 275 to transform signals from a time-domain representation into a frequency domain representation. The number of samples used by the transformation unit is typically called a sample set. The total number of these multiples, may be adjusted to define the temporal response of the filters that comprise the digital filter bank embodied in the weighted overlap-add structure. Once the filtering register is populated with the proper number of samples, the value stored in the filtering register 245 may then be multiplied by weighting coefficients 255. In some embodiments of the present invention, these coefficients may define a root-raised-cosine filter response. The product, which is generated by the multiplier 250, is directed to the fragmentation unit 260. The fragmentation unit fragments the product generated by the multiplier 250 into individual sample sets.

The individual sample sets generated by the fragmentation unit 260 may then be added together by the adder 270. The transformation unit 275 may then transform the sum of the sample sets into a frequency-domain representation of the plurality of modulated carriers received by way of the analog signal 235. In some embodiments of the present invention, the transformation unit 275 may comprise a signal processor that implements a Fourier transform. The Fourier transform function may be implemented as a fast Fourier transform of K number of samples. The decoder 280 may then extract individual sub-streams of data from each of the individual carriers represented in this frequency-domain representation of the sum of the sample sets received by the transformation unit 275. The combiner 290 may then assemble the individual sub-streams of data into an aggregate data stream 300.

The present invention comprises an efficient method for transmitting data using modulation that is enhanced with spectral control features. In one embodiment of this invention, a method is provided for modulating carriers according to data wherein each carrier is subjected to filtering by a digital filter. This method results in a digital sample stream or, in one alternative variation of the present method, an analog signal either of which comprise a plurality of modulated carriers wherein each carrier may have side-lobes lobes that are attenuated. The method of the present invention also comprises an efficient process for receiving a plurality of modulated carriers by first subjecting an incoming signal to a digital filter bank. The digital filter bank promotes selection of a carrier to the exclusion of other spurious artifacts that may be present in the signal.

The combination of a Discrete Fourier Transform with a digital window is known in the art as a digital filter bank. Prior teachings of digital filter banks are prevalent in the art and one excellent reference for the design and implementation of digital filter banks is the engineering text entitled "Multirate Digital Signal Processing" by Chrochiere and Rabiner (ISBN No. 0-13-605162-6). Within that text, Chapter 7 provides an excellent teaching with respect to implementation of a digital filter bank as applied to spectrum analysis and is hereby incorporated in its entirety (Chapter 7) into this application by reference. Digital filter banks have been used for spectrum analysis, but no known art has applied these digital filter bank techniques to spectral containment for multi-carrier modulated data communications. The present invention comprises embodiments of digital filter banks that are referred to as weighted overlap-add structures. These structures are fully taught by the referenced text.

Multi-carrier modulation techniques for low cost applications have typically not incorporated high performance spectrum control features due to the complexity of prior art techniques, which typically have required the use of an individual digital filter for each carrier. Such an approach also eliminates the ability to perform the simultaneous modulation of all the carriers using a Discrete Fourier Transform, an ability that is one of the key benefits of using multi-carrier modulation. Thus in traditional approaches each carrier must be filtered and converted to its intended carrier frequency independently.

By applying digital filter banks to the problem of spectral control in a multi-carrier modulation communications system, the problem of controlling the energy composition of a large number of narrow frequency bands can be overcome in a cost effective, computationally efficient manner. With the appropriate choice of filter coefficients, digital filter banks can be applied to shaping each carrier in a multi-carrier modulation and controlling the spectrum of the individual carriers.

The filtered multi-carrier modulation scheme of the present invention is functionally equivalent to a prior art system in which a data stream is splintered into a set of substreams, with each substream being used to modulate a different carrier. To achieve spectral control in this prior art system, the digital samples used to modulate each carrier are first filtered by a spectral containment filter, which may be implemented as a digital filter. The most narrowband filter possible from a theoretical perspective has a one-sided bandwidth in Hz equal to half of the sample rate R in samples per second of the sample stream modulating the carrier. Practically speaking, it is not possible to make a filter this narrow, so typically the filter is wider by a factor of $(1+\alpha)$, where the quantity $\alpha$ is referred to as the "excess bandwidth" of the filter, because it represents the amount of extra bandwidth beyond the theoretical minimum that the system uses.

The Nyquist sampling theorem requires that in order to accurately represent a signal of a given bandwidth, we must sample at a rate equal to at least two times the highest frequency present in the signal. Thus the sample rate at the filter output must be at least $R(1+\alpha)$. This means that a sample rate conversion is required as the samples pass through the filter. In prior art systems, the conversion factor is typical chosen to be an integer, which might result in a doubling or quadrupling of the sample rate.

In the prior art system, the sample stream output by each of the digital filters would then be multiplied by a stream of samples of a sinusoid at the carrier frequency for the corresponding carrier. Typically this frequency is much higher than the sample rate of the filter output, so a very large number of multiplication operations is required for each carrier. The product of the carrier frequency samples an the filter output samples for each carrier must then be summed to produce the multi-carrier modulated sample stream.

The prior art receiver reverses this sequence. The received sample stream is multiplied by samples representing each of the set of carriers in use, and the results of these multiplications are then filtered with a high-speed digital filter for each of the carriers. The number of operations required in the receiver is even greater than in the transmitter as a result.

Prior art multi-carrier modulation systems such as OFDM are able to implement the multiplication by the carrier frequency sample streams all at once for all the carriers through the use of the Discrete Fourier Transform. The drawback of this prior art approach has been that it does not work when the samples on each carrier are filtered prior to modulating the carriers.

In the invention described herein, a filter bank is used in both the transmitter and the receiver to efficiently implement a DFT based approach that provides the identical functionality to the inefficient prior art structure with one filter per carrier at a fraction of the complexity. In the transmitter of this approach, a set of K samples is input to a modulator. The rate at which sets of K samples is provided to the modulator is called the symbol rate. For ease in implementation, typically K is a power of two, although this is not essential. The K samples are typically complex valued (meaning they are represented by a real part and an imaginary part). Some of the K samples may always be set to zero, in which case the corresponding carrier in the multi-carrier modulation is not used. The phase used to modulate the kth carrier is the phase of the vector representation of the kth complex sample, and the amplitude is the magnitude of that vector representation. The method by which the bit stream to be transmitted is mapped to the K complex values determines the type of modulation to be applied to each carrier. It should be apparent to those skilled in the art that any modulation used in a prior art single carrier modulation system can also be used in the invention described herein.

Each symbol time, a set of K input samples is processed by an inverse Fast Fourier Tranform (IFFT), creating a set of K output samples. The IFFT output samples may be complex valued, or, if appropriate requirements are placed on the K input samples, the output samples may be real valued.

According to the invention described herein the IFFT output samples are then replicated some number of times n to form a set of samples that is nK in length. The replicated sample set is then multiplied on a sample-by-sample basis with a set of window coefficients. (The term "sample-by-sample basis" as used herein means that the result of an operation on sets of operands with M elements in each set is also a set of M elements, where the mth member of the result set is obtained by performing the specified operation using the mth element of each set of operands.)

The set of window coefficients determine the spectral shape of each carrier, and are generated by sampling the time domain impulse response of the desired spectral shaping function. If the desired window length is not equal to an integer multiple of K, the coefficient set can be filled out with zero coefficients so that the length used in the implementation is an integer multiple of K.

The result of multiplying the replicated sample set by the window coefficient set is then added to the contents of an nK sample long output shift register on a sample-by-sample basis.

The operations described to this point each occur once per symbol time. Each symbol time, a number of samples that is typically equal to $K(1+\alpha)$ is shifted out of the output shift register. As each sample is shifted out of the shift register, a zero sample is shifted into the input. Thus when the next FFT is computed, the newest $K(1+\alpha)$ positions of the shift register will typically have zeros in them.

In the prior art, the receiver for a multi-carrier modulation system with spectrum containment filtering would include K downconversion modules each followed by an individual spectral containment filter. The downconversion modules multiply the input sample stream by samples of a sinusoid at the carrier frequency to be received by that downconversion module. The sample rate after this downconversion must be maintained at the same rate as the input until after the operation of digital filtering, thus requiring a very high rate of computation since the operation is replicated for each carrier.

In the present invention, a filter bank is used to implement the process of downconversion and filtering. Received samples typically (but not always) come from an analog to digital converter. These samples are fed into a shift register for a filtering window whose length is nK. Typically after $K(1+\alpha)$ samples have been shifted into the shift register, the shift register contents are multiplied on sample-by-sample basis with a set of window coefficients. The resulting set of nK windowed samples is then fragmented into n sets of K samples each, and these n sets are then summed together on a sample-by-sample basis to form a single set of K samples. These K samples are then processed by an FFT.

The task of any good data communications receiver is to form an estimate of the data input to the transmitter. The receiver of the present invention forms an estimate of the phase and amplitude used to modulate the kth carrier at the transmitter from the kth output sample from the FFT.

The coefficients selected for the window determine the spectral shape of the receiver filter. Typically a set of coefficients defining a root raised cosine filter may be used in both the transmitter and the receiver, although it should be apparent to those skilled in the art that other filter designs might be chosen as well. Typically (but not always) it is desired that the transmitter and receiver filters should be matched (that is, the set of coefficients used in the receiver should be equivalent to the reverse-ordered-in-time set of coefficients used in the transmitter). Likewise it is typically (but not always) desirable that the convolution of the transmitter and receiver filters satisfy the Nyquist criterion for zero intersymbol interference sampling at the ideal sampling instance—that is, at any non-zero integer number of symbol time offset from the ideal sampling time, the convolution of the transmitter and receiver coefficient sets has a value zero.

It should also be apparent to one skilled in the art that sets of filter coefficients that deviate slightly from their ideal mathematical representations can provide adequate performance in this application, and that this invention anticipates the use of such non-ideal implementations of the ideal mathematical representation of the filters. Such non-ideal implementations might include but is not limited to truncation of the coefficient set, quantization of the coefficient set, saturation of the coefficient set, or the application of a window to the coefficient set.

In a filtered multi-carrier modulation scheme, K samples are typically input into a modulator at a given time. The sample rate is up-converted by a factor of M (which is not necessarily an integer) and the samples are filtered with the filter f(n). The outputs of the filters are modulated by K equally spaced complex carriers and summed. If the filter bandwidths are less than the carrier spacing, then the resulting systems looks like a set of traditional frequency division multiplexed (FDM) modulators.

Up-conversion of the sample rate is required because the bandwidth of the signal represented by the sum of all the channels is much greater than the bandwidth of a single channel. If M is equal to K, then if f(n) is an ideal sample rate conversion filter that removes alias energy completely, we have the minimum carrier spacing required to reproduce the original signals exactly. In this case the system is said to be critically sampled. A more likely scenario is that f(n) requires some excess bandwidth, and then we must have $M=(1+\alpha)K$, where alpha is the excess bandwidth.

Crochiere and Rabiner describe filter banks where $K=IM$, for I some integer. This is contradictory to the approach to selecting the ratio just given because the incorporated text applies filter banks in spectral analysis applications where it is best to over-sample in frequency in order to improve spectral resolution. In the communications application taught here, over-sampling data in the time domain representation is essential in order to demodulate carrier signals.

According to the teachings of the present invention, a receiver reverses the transmitter process in order to recover the original samples. It should be apparent that if the carrier spacing is wide enough that the filter shapes don't overlap, and the convolution of the filters h(n) and f(n) satisfies the Nyquist criterion for zero intersymbol interference, that the system is able to make Yk(m) exactly equal to Xk(m). Thus for example, h(n) and f(n) might be root-raised cosine shapes with an excess bandwidth of 25% or so. This additional bandwidth and the type of filter are illustrative and are not intended to limit the scope of the present invention. The net conclusion is that if the convolution of f(n) and h(n) satisfies the Nyquist criterion for zero ISI (that is, the convolution result is 1 for n=0 and 0 at multiples of the symbol rate), and if in the frequency domain the spectra of the frequency shifted versions of f*h do not overlap at the tone positions, then the desired samples are perfectly recoverable.

Figure 7:
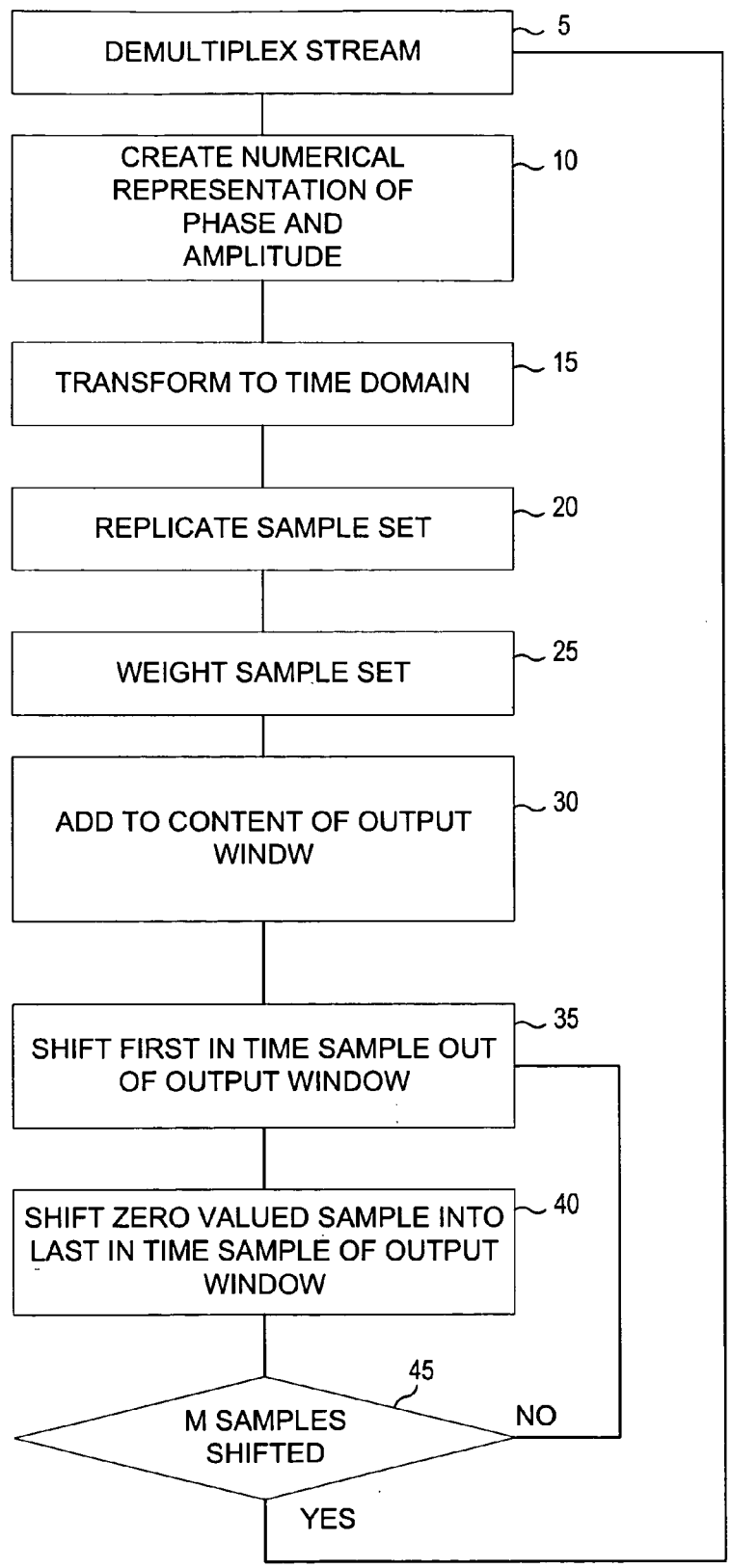
FIG. 7 is a flow diagram of one illustrative process for generating a spectrum controlled multi-carrier suite.

FIG. 7 is a flow diagram of one illustrative process for generating a spectrum controlled multi-carrier suite. Generally, a digital data stream may be splintered into substreams of data and each substream may then be used to modulate a carrier in the frequency-domain. The carrier may be modulated in any of a number of ways, including quadrature amplitude modulation (QAM), differential phase shift keying (DPSK) and differential amplitude phase shift keying (DAPSK). It should be noted that the scope of the present invention should not be limited to any particular modulation technique. Once the modulated carriers are represented in the frequency-domain, they may be transformed into a time-domain sample set. Digital filtering is then applied in order to attenuate any side-lobes or other artifacts that may be affiliated with the modulated carriers. These carriers may optionally be converted into an analog signal.

According to one illustrative method, a digital filter bank commensurate with the teachings of Chapter 7 of Crochiere and Rabiner may be applied. In one such embodiment, a data stream may be splintered into a plurality of data substreams (step 5). These data substreams may then be used to generate a numerical representation of a plurality of modulated carriers in the frequency-domain (step 10). The numerical representation may be in the form of phase and amplitude values for each carrier. Accordingly, one variation of the present method provides for mapping data bits to a phase and amplitude for each symbol time. The encoding process that converts the data substreams to numerical representations of modulated carriers may further include any combination of data processing functions known in the art, including but not limited to application of forward error correction coding, interleaving, data scrambling or randomization, or insertion of pilot bits used to assist demodulation at a receiver. The frequency-domain representation of the carriers may then be converted into a time-domain sample set (step 15). The time-domain sample set may then be replicated some number of times "n" to fill the width of a filter with a desired filter response duration (step 20). These replications of the sample set may then be weighted on a sample-by-sample basis with a set of filter coefficient weights (step 25). In one embodiment of this illustrative method, the coefficients may define a root-raised-cosine filter.

The method of the present invention provides for a weighted-overlap-add process. Accordingly, a new output window is generated when weighted sample set replicas are added to the previous contents of the output window (step 30). The output window may be a shift register. After the addition is complete, the first-in-time portion of the output window is shifted out (step 35) as zeros are shifted into the last-in-time position of the output window (step 40). This process continues until all of the replicas are shifted out of the output window output (step 45).

Figure 8:
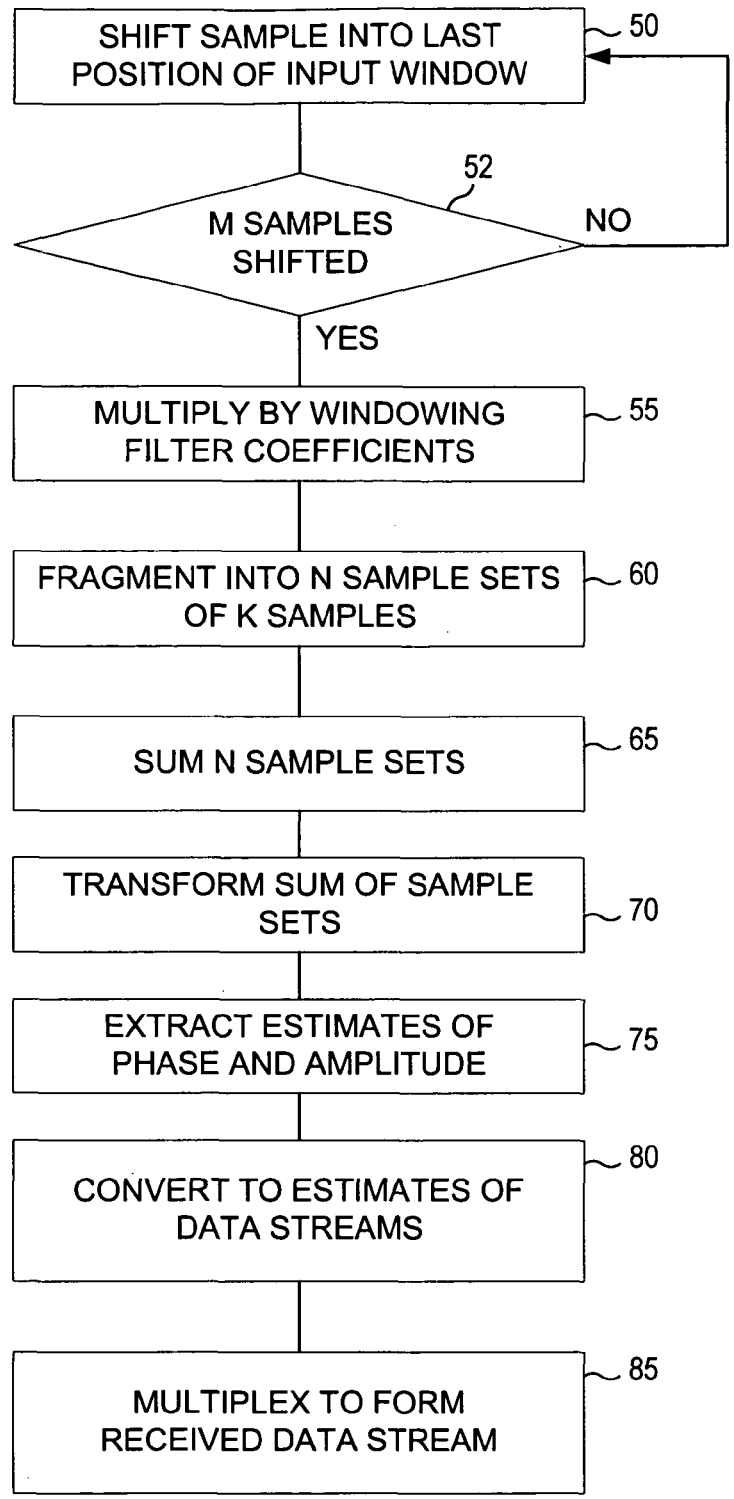
FIG. 8 is a flow diagram that depicts one illustrative method for receiving a plurality of individually modulated carriers according to the present invention.

FIG. 8 is a flow diagram that depicts one illustrative method for receiving a plurality of individually modulated carriers according to the present invention. An input sample stream is typically generated by converting a received analog signal into digital samples. The digital sample stream may then be subjected to a filter bank comprising a windowing function followed by a transform function. The characteristics of the windowing function determine the spectral property of a receiver filter for each carrier represented by the sample stream. The transform operates on the output of the windowing function and generates a set of samples that provide a numerical representation of the receiver estimate of the phase and amplitude used to modulate each carrier by the transmitter. A decoding process converts these estimates of phase and amplitude to estimates of the data substreams present in the transmitter. The decoding process typically performs functions that reverse the respective functions used in encoding in the transmitter, including but not limited to, decoding any forward error correcting coding, de-interleaving, de-scrambling, de-randomizing, removal of pilot bits, and reversal of the mapping of the data bits to phase and amplitude information used by the transmitter. According to this general method, the plurality of data substreams may be combined to form a data stream.

In one example method, the first step of the invention in receiving a signal modulated with a multi-carrier modulation is to shift digital samples of the signal into the last-in-time position of a window input shift register (step 50). Samples are shifted into the shift register until some required number of sample M have been shifted in (step 52). In some embodiments of the invention, the value of M may be constant, while in other embodiments, the value of M may be adjusted away from some nominal value from time to time to adjust the time at which symbols are formed. In one embodiment of the invention, the nominal value of M comprises a multiple of the number of samples used in a transformation process to convert the samples into a frequency-domain representation of a plurality of modulated carriers, where the multiple is one plus the excess bandwidth of the filter expressed as a fraction. In other embodiments of the design, other values of M may be chosen.

When the desired number of samples M has been shifted into the window input shift register, the contents of the window input shift register may be weighted by multiplying them on a sample-by-sample basis by a pre-established set of windowing filter coefficient weights that define a filter response (step 55). In one example method, the pre-established coefficients may define a root-raised-cosine filter response. The filter window may then be fragmented into n sample sets of K samples each (step 60). The n sample sets may then be summed together on a sample-by-sample basis (step 65). The sum of the sample sets may then be transformed into a frequency-domain representation (step 70). In one example method, the transformation is a Discrete Fourier Transform, which may be implemented using a Fast Fourier Transform algorithm in any of its variants. The receiver then processes the frequency domain representation of the sample set to extract a numerical representation of the receiver estimate of the phase and amplitude used to modulate each carrier at the transmitter (step 75). In one example method, the process of extracting the numerical representations may be accomplished by the use of a single tap equalizer for each carrier. In another example method, the process of extracting the numerical representations may be accomplished by the use of an all digital carrier tracking loop and an all digital gain correction loop.

Data substreams may then be extracted from the numerical representation of the receiver estimate of the phase and amplitude (step 80) and multiplexed with other substreams extracted from other carriers represented in the frequency-domain sample set (step 85).

Figure 9:
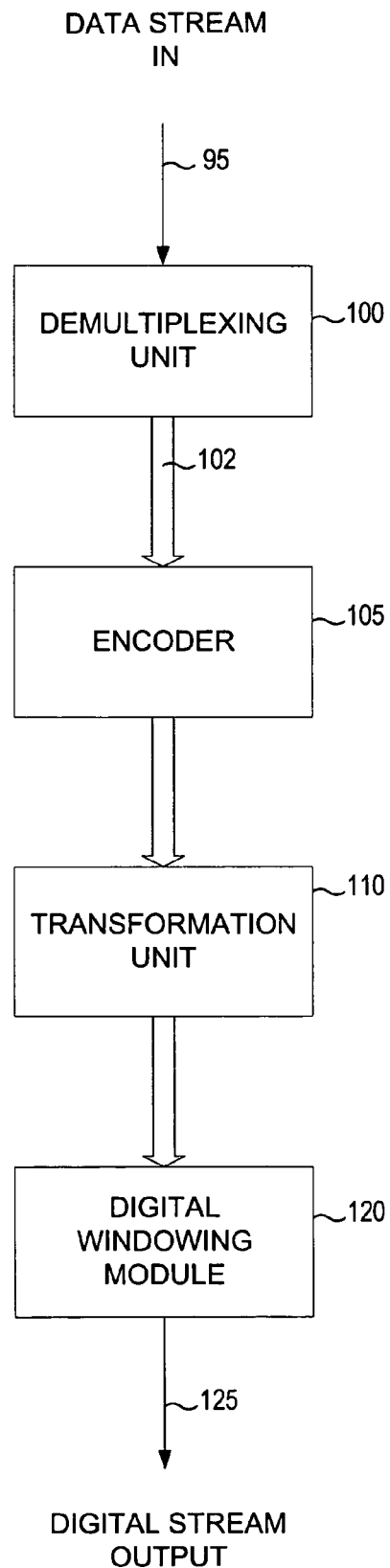
FIG. 9 is a block diagram of one illustrative embodiment of a data communications device employing the methods of the present invention.

FIG. 9 is a block diagram of one illustrative embodiment of a data communications device employing the methods of the present invention. A data communications device may comprise a splintering unit 100 capable of accepting a digital stream of data 95. The data communications device may further comprise an encoder 105, a transformation unit 110, and a digital windowing module 120.

In operation, the splintering unit 100 receives the digital stream of data 95 and creates a plurality of substreams of data 102. A substream of data 102 may then be input to the encoder 105. Typically, the encoder 105 creates a numerical representation of the phase and amplitude used to modulate a plurality of carriers according to the various substreams of data that it may receive from the splintering unit 100. This numerical representation may be transformed into a time-domain sample set by the transformation unit 110. The time-domain sample set may then be windowed by the digital windowing module 120 in order to attenuate spectral side-lobes of each carrier represented in the time-domain sample set. A filtered time-domain sample set may then be output 125. In one example embodiment of the present invention the output samples 125 may be converted to an analog signal using a digital to analog converter.

Figure 10:
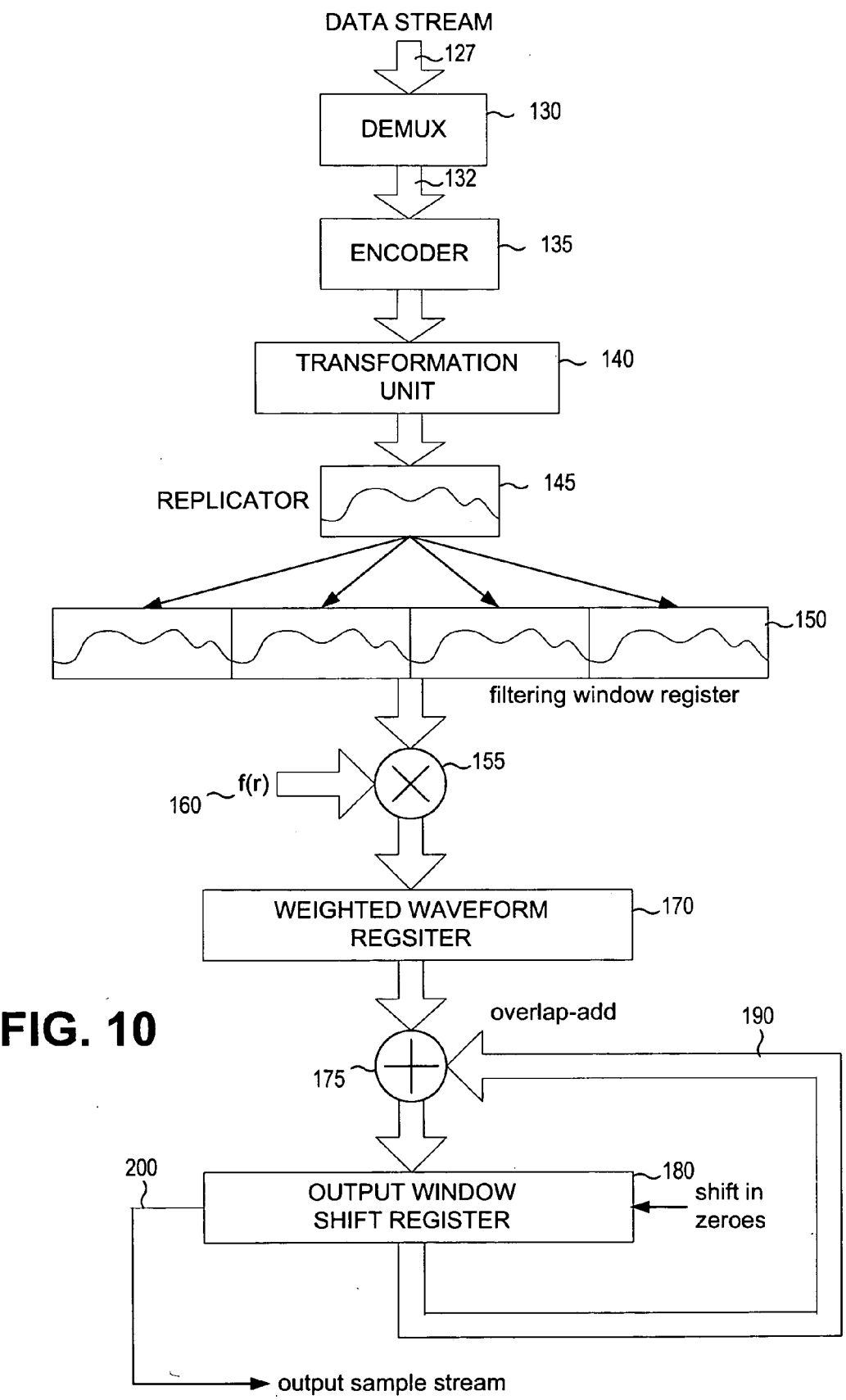
FIG. 10 is a block diagram of one illustrative structure of a data transmitter comprising a weighted overlap-add structure according to the teachings of the present invention.

FIG. 10 is a block diagram of one illustrative structure of a data transmitter comprising a weighted overlap-add structure according to the teachings of the present invention. According to this alternative embodiment, a digital data stream 127 is partitioned into a plurality of substreams of data 132 by a splintering unit 130. The data transmitter further comprises an encoder unit 135, a transformation unit 140, a replicator 145, a filtering window register 150, a multiplier 155, a weighted waveform register 170, an adder 175, and an output register 180. In some embodiments, the data transmitter may further comprise a digital to analog converter that converts the output sample stream into an analog waveform.

The encoder 135 receives a plurality of substreams of data and generates a numerical representation of a plurality of carriers. The encoder may represent the The encoder 135 typically adjusts this numerical representation in accordance with the data represented by the plurality of substreams it receives. This enables modulation of the plurality of carriers represented in the numerical representation generated by the encoder 135. In some embodiments, the encoder may adjust the numerical representation of a carrier in order to vary its phase and/or amplitude according to a substream of data. This may result in a QAM modulation of the numerically represented carrier. It should be noted that the scope of the present invention should not be limited to any one form of modulation that may employed by the encoder. For example, other embodiments may use DPSK and/or DAPSK modulation.

The transformation unit 140 typically receives a frequency-domain representation of a plurality of modulated carriers from the encoder 135. The transformation unit 140 typically transforms this numerical representation into a time-domain sample set that is provided to the replicator 145. In some embodiments of the present invention, the transformation unit 275 may comprise a signal processor that implements an inverse-Discrete Fourier Transform. The inverse-Fourier transform function may be implemented as an inverse-Fast Fourier Transform of K number of samples. The replicator 145 creates a plurality of copies of the time-domain sample set and stores these in a concatenated fashion in the filtering window register 150. The number of copies n created by the replicator may be varied in accordance with a desired response duration of the filter. Typically achieving a more rapid spectral rolloff with frequency requires that the window must be longer and thus the number of copies n must be larger. It will be recognized by those skilled in the art that many different window lengths and thus many different values of n could be used with the present invention. Moreover, if the desired window length is not an integer number of time domain sample sets, it will be noted that the window can be extended to be an integer number of sample sets by adding zero valued weighting coefficients at the beginning and end of the window. Alternatively, the first and last replication output by the replicator can be truncated to make the filtering window register length match the desired window length.

Weighting coefficients 160 are samples of the time domain response of the desired filter shape. In one embodiment of the present invention, the weighting coefficient are pre-established and stored in memory. In some embodiments, the coefficients 160 may define a root-raised-cosine filter response. The multiplier 155 multiplies the contents of the filtering window register 150 by the weighting coefficients 160 on a sample-by-sample basis to generate a weighted waveform. The weighted waveform may then be stored in a weighted waveform register 170.

The output of the weighted waveform register 170 is added to the value stored in the output register 180 by the adder 175. The output register 180 is then shifted causing the sample in the first-in-time position to be directed to an output sample stream 200. Each time the output register 180 is shifted by one sample, zeros 195 are shifted into the last-in-time sample position of the output register 180. The shifting process continues until a number of samples M has been shifted out of the output register. The operations described for the functions from the demultiplexing unit 130 to the overlap-add function 175 inclusive each execute one time for each M samples shifted out of the output register. Typically the ratio of M/K is chosen to be greater than or equal to one plus the excess bandwidth of the chosen filter response expressed as a fraction, although those skilled in the art will recognize that a suboptimum example of the present invention might have M/K less than this amount.

In some embodiments, the data transmitter may further comprise a digital to analog converter that converts the output sample stream 200 into an analog waveform.

Figure 11:
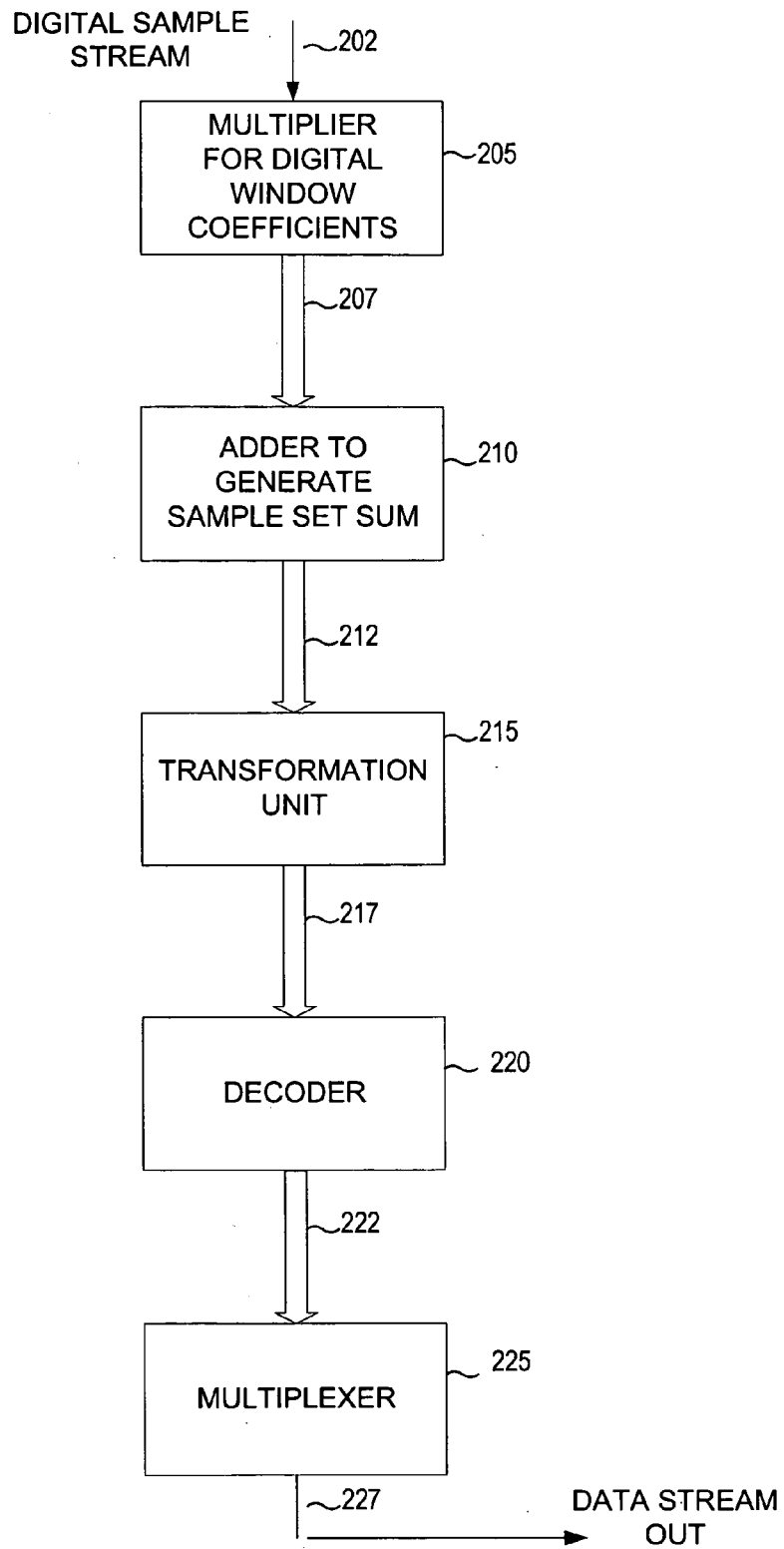
FIG. 11 is a block diagram of one exemplary embodiment of an OFDM receiver employing the methods of the present invention.

FIG. 11 is a block diagram of one example embodiment of an OFDM receiver employing the methods of the present invention. According to this example embodiment, a receiver for use in receiving multi-carrier modulation may comprise unit for multiplication by digital window coefficients 205, a unit for generation of a sample set sum 210, a transformation unit 215, a decoder 220 and a multiplexer 225. An sample stream input 202 representing a signal modulated with multi-carrier modulation in which the individual carriers have been filtered for spectral containment or other purposes is input to a unit for multiplication by digital window coefficients 205. Each M input samples, the unit 205 forms a number n of K-sample time domain sample sets 207 by multiplying the last nK samples from the sample stream 202 by a set of digital window coefficients on a sample-by-sample basis.

The unit for generation of a sample sum set 210 accepts the n K-sample time domain sample sets 207 and sums them together on a sample-by-sample basis to form a sample set sum 212. The transformation unit 215 may then transform the sample set sum 212 into a numerical representation of a receiver estimate 217 of the phase and amplitude used to modulate each of a plurality of carriers by the transmitter. The decoder 220 may then extract substreams of digital data 222 from the numerical representations of a receiver estimate 217 of the phase and amplitude used to modulate each of the plurality of carriers by the transmitter. The multiplexer 225 may then combine the individual substreams of digital data to form an aggregate digital data stream output 227.

Figure 12:
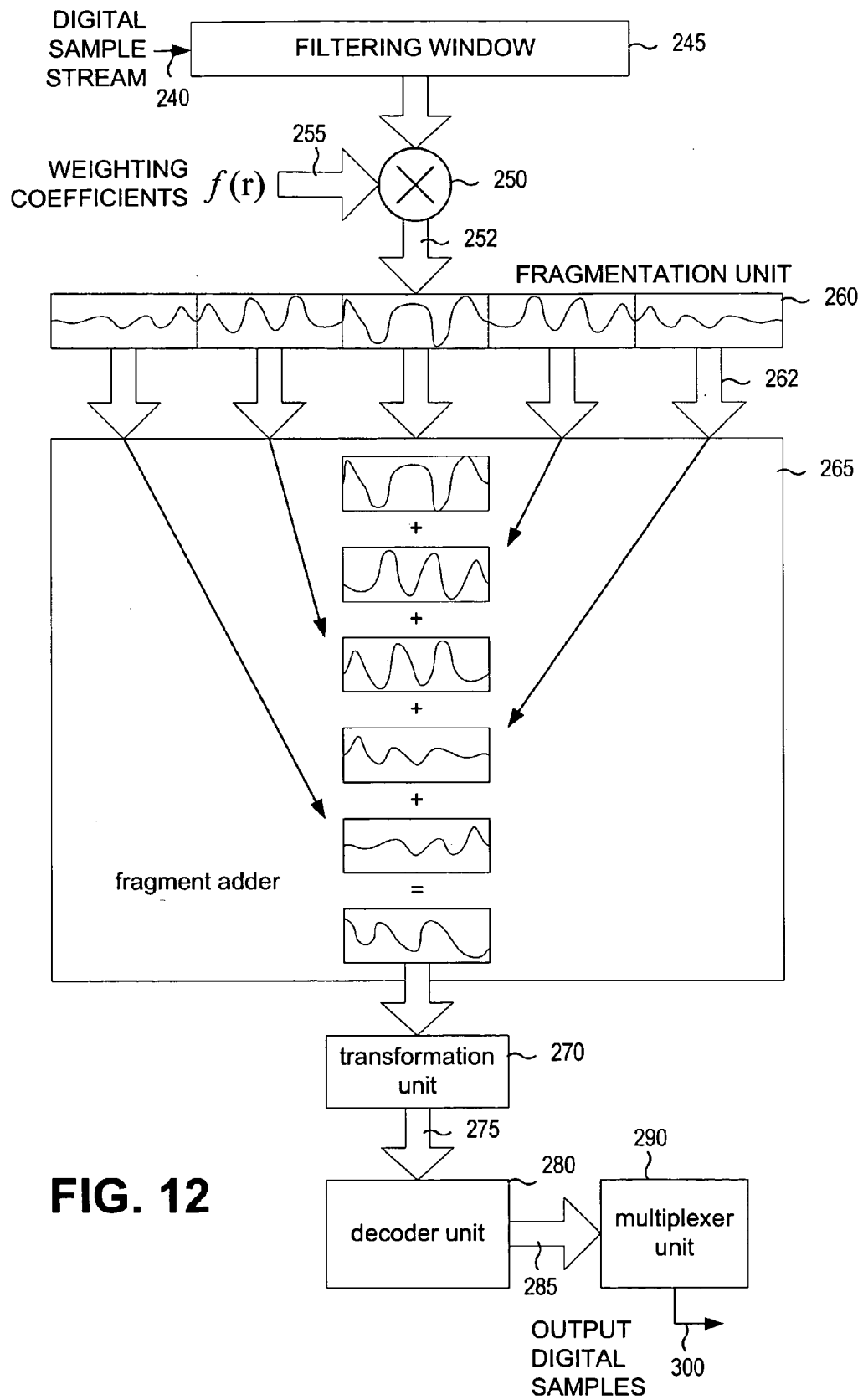
FIG. 12 is a block diagram of one illustrative embodiment of the data receiver comprising a weighted overlap-add structure according to the present invention.

FIG. 12 is a block diagram of one illustrative embodiment of the data receiver comprising a weighted overlap-add structure according to present invention. According to this alternative embodiment of a data receiver, the data receiver further comprises a filtering window shift register 245, a multiplier 250, a fragmentation unit 260, a fragment adder 265, a transformation unit 270, a decoder unit 280 and a multiplexer unit 290.

The filtering window shift register 245 accepts some number M of digital samples from an input digital sample stream 240. In one example embodiment of the invention, the input digital sample stream 240 may be produced by converting an analog signal to a digital sample stream using an analog to digital converter. Typically the length in samples of the filtering window shift register 245 is substantially greater than M. Typically, the number M of digital samples received by the filtering register is a multiple of the number of samples K used by the transformation unit 270 to transform signals from a time-domain representation into a frequency domain representation, with the exact multiple being at least one plus the excess bandwidth of the filter shape used by the receiver expressed as a fraction, although those skilled in the art will recognize that a sub-optimal implementation of the invention could employ a smaller multiple. In one example embodiment of the invention, the value of M may be varied from time to time as required to adjust the receiver symbol timing—that is, the time relative to the input digital sample stream at which the receiver performs the windowing, fragmentation, and transformation functions.

The number of samples used by the transformation unit is typically called a sample set. The total number of these multiples, may be adjusted to define the temporal response of the filters that comprise the digital filter bank embodied in the weighted overlap-add structure. Once the filtering register is populated with the proper number of samples. When the desired number M of samples has been shifted into the filtering window shift register 245, the contents of the filtering window shift register are multiplied on a sample-by-sample basis with a set of weighting coefficients 255. In some embodiments of the present invention, the weighting coefficients 255 may define a root-raised-cosine filter response. In another embodiment of the present invention, the weighting coefficients 255 may be pre-computed and stored in a memory. The product 252, which is generated by the multiplier 250, is directed to the fragmentation unit 260. The fragmentation unit fragments the product generated by the multiplier 250 into an integer number of individual sample sets of length K. It will be apparent to those skilled in the art that if the number of samples in the product 252 is not an integer multiple of K, then zeroes can be pre-pended to the first fragment and appended to the last segment as needed to create an integer number of K sample fragments. Moreover, While the figure shows a specific embodiment of the invention with five fragments in order to aid clarity, it will also be apparent to those skilled in the art that any number of fragments can be used, with the choice of the number of fragments depending on the required filter performance.

The individual sample sets generated by the fragmentation unit 260 may then be added together on a sample-by-sample basis by the fragment adder 265. The transformation unit 270 may then transform the sum of the sample sets into a numerical representations 275 of the receiver estimate of the phase and amplitude used to modulate each of the plurality of carriers by the transmitter that is the ultimate source of the input digital sample stream 240. In some embodiments of the present invention, the transformation unit 275 may comprise a K-point Discrete Fourier Transform. The Discrete Fourier Transform function may be implemented as a Fast Fourier Transform. The decoder unit 280 may then extract individual substreams 285 of data from each of the individual carriers from the numerical representations 275 generated by the transformation unit 275. The multiplexer unit 290 may then assemble the individual substreams of data 285 into an aggregate data stream 300.

In one specific embodiment of the invention described herein, K=2048 carrier frequencies are defined, but only the carrier frequencies from k=103 to k=716 and from k=1332 to k=1945 are actually used for data transmission. The samples used to modulate all carriers 0 to 102 and 717 to 1023 are always set to zero by the encoder unit 135. The encoder unit 135 sets the sample on carrier 2048-k to be equal to the complex conjugate of the sample on carrier k. This property results in a real-valued output from the IFFT used for the transformation unit 140 at the transmitter. A new IFFT is computed each 32 usec, corresponding to a symbol rate of 31.25 ksym/sec.

The encoder unit 135 in the specific embodiment being described includes Reed Solomon decoding over GF(256) with variable block length, interleaving, and a trellis code. The encoder unit 135 also randomizes data to be transmitted using a pseudo-random cover sequence. The encoder unit 135 maps the result of trellis coding into numerical representations of phase and amplitude conforming to m-ary QAM modulations with m from 1 to 10 bits per symbol, or to mDPSK with m from 1 to 6 bits per symbol, or to DAPSK modulation with m from 1 to 8 bits per symbol.

The output of the IFFT that comprises the transformation unit 140 is replicated 13 times by the replicator unit 145, yielding 26,624 samples. The replicated sample set is multiplied on a sample-by-sample basis by window coefficients 160 that are samples of the time domain response of a root raised cosine filter having an excess bandwidth of 25% and windowed with a Tukey window having rolloff parameter 0.305. Specifically, the kth coefficient in the window is given mathematically by:

$$w(k) = \frac{\sin\left[\frac{0.75 \cdot \pi(k-13312)}{2560}\right] + \frac{k-13312}{2560} \cdot \cos\left[\frac{\pi(k-13312)}{2048}\right]}{\frac{\pi(k-13312)}{2560} \cdot \left[1 - \left(\frac{k-13312}{2560}\right)^2\right]} \cdot t(k)$$

The purpose of the Tukey window t(k) is to reduce sidelobes generated in the frequency response of the filter as a result of truncation of the theoretically infinitely long time domain response. The window t(k) is defined as $t(k)=0$ for k<0

$$t(k) = 0.5 \cdot \left(1 - \cos\left(\frac{\pi \cdot (k+0.5)}{4061.16}\right)\right) \text{ for } 0 \leq k < 4061$$

$t(k)=1$ for 4060<k<22563

$t(k)=t(26623-k)$ for $22563 \leq k < 26624$ $t(k)=0$ for k>26623

The product of the replicated sample set and the window coefficients is then added sample-by-sample to the contents of an output shift register 180 holding 26624 samples. The output shift register 180 is then shifted 2560 times at an 80 MHz clock rate, and the samples are converted into an analog waveform using a digital to analog converter. As each sample is shifted out of the output side of the shift register, a zero sample is shifted into the input side. When 2560 samples have been shifted out, a new IFFT is computed by the transformation unit 140, its output is replicated and windowed, and the result is again added to the shift register contents.

Figure 13:
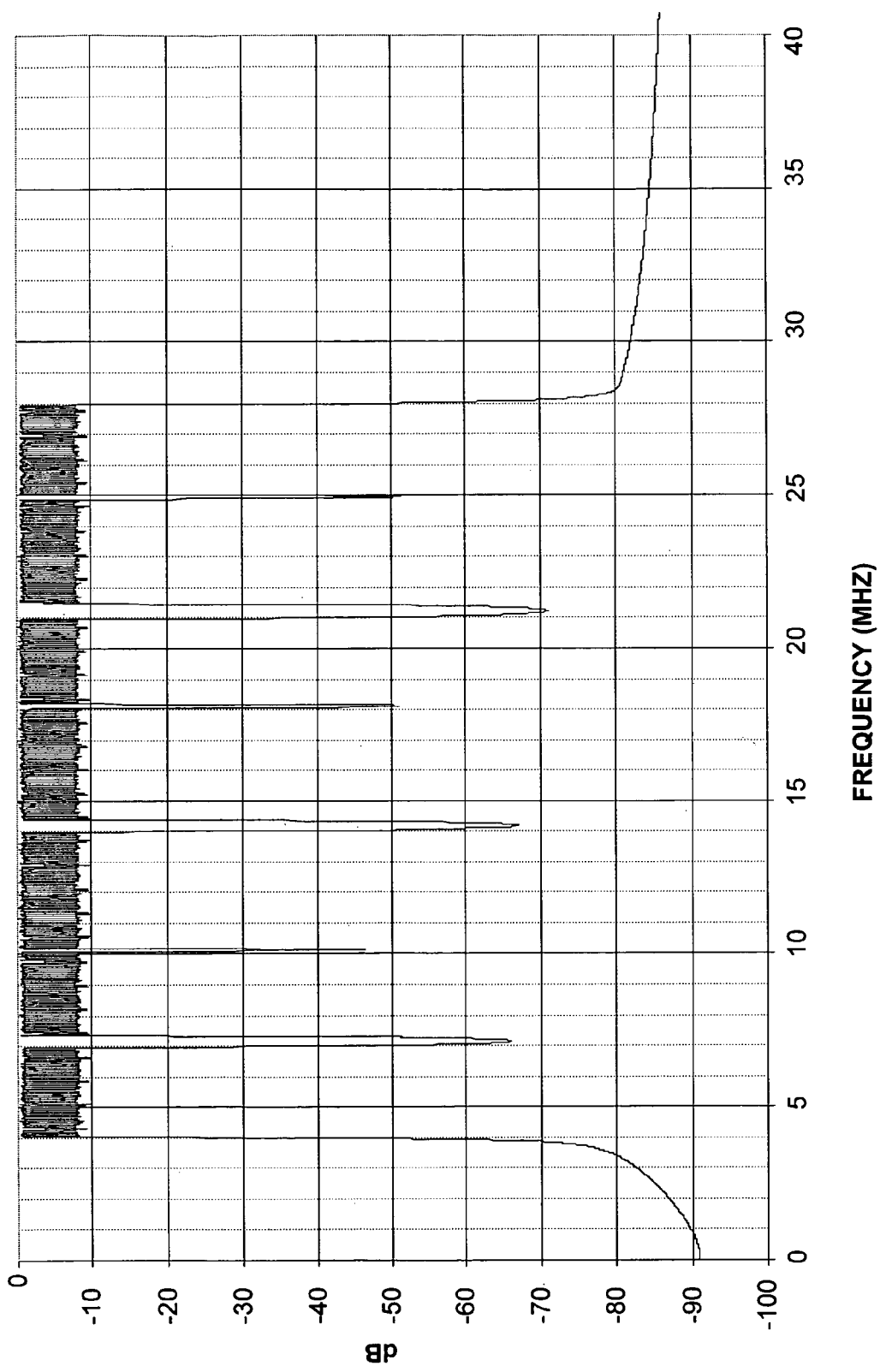
FIG. 13 shows the spectrum of the transmitted waveform that results from an embodiment of the invention.

FIG. 13 shows the spectrum of the transmitted waveform that results from this embodiment of the invention. Certain carrier frequencies between carrier 103 and carrier 716 have their data substream set to zero to reduce emissions in frequency bands set aside for amateur radio usage. These frequencies exhibit sharp nulls in the spectrum as shown.

The receiver of the same specific embodiment of the present invention also has a filtering window shift register 245 that is 26624 samples in length. Samples from an analog to digital converter taken at 80 MHz are shifted into the filtering window shift register. At the symbol rate, which is nominally each 2560 sample times (31.25 kHz), the contents of the filtering window shift register 245 are multiplied on a sample-by-sample basis with samples of the window coefficient set 255. These samples are identical to those used in the transmitter. Because the filter time domain response is symmetric in time, using identical coefficients to the transmitter results in a matched filter design, and because the filters are both root raised cosine filters, the two together form a raised cosine shape which satisfies the Nyquist criteria for zero intersymbol interference at integer multiples of the symbol time.

The 26624 samples resulting from the product of the window and the filtering window shift register contents are then broken into 13 fragments of 2048 samples each by the fragmentation unit 260. These fragments are summed together to form a single block of 2048 samples. These samples are then converted to the frequency domain by a transformation unit 270 that uses a 2048 point FFT. The resulting complex valued outputs are then used to form numerical representations of the receiver estimate of the phase and amplitude used to modulate the corresponding carrier at the transmitter. The decoder unit 280 includes carrier phase tracking and gain tracking on each carrier that can be implemented by many means that will be apparent to those skilled in the art. One such means is to use a second order carrier tracking loop to track the carrier phase and a first order all digital AGC loop to track the gain. The decoder unit 280 also includes a reverse mapper that converts the phase and amplitude information to data bits, trellis decoding, de-randomizing, de-interleaving, and Reed Solomon decoding.

Another issue in receiver design is symbol time tracking—that is, determining the best time at which to begin the process of multiplying the contents of the filtering window shift register by the window. In this example embodiment, adjustment in the timing is achieved by varying the number of samples from the input digital sample stream 240 that are input to the filtering window shift register 245 to an appropriate value other than 2560 to implement any needed timing phase shift. For example, to advance the timing by 8 samples, the receiver would only shift 2552 samples into the filtering window shift register before beginning the windowing process.

The difference between the number of samples in the FFT and the number of samples output by the filter band provides the ability to create the spectrum of the filtered signal without overlap of the signals from each carrier. In the specific embodiment just described, the carriers are spaced at 80 MHz divided by 2048, or 39.0625 KHz. The symbol rate on each carrier is 80 MHz divided by 2560, which is 31.25 ksym/sec. A modem using a symbol rate of 31.25 ksym/sec requires a theoretical minimum of 31.25 kHz of bandwidth (two side spectrum). Using a root raised cosine filter with excess bandwidth 25% increases this requirement by 25% to 39.0625 kHz. Thus in the specific embodiment described above, the carriers are spaced at the minimum possible spacing to eliminate spectral overlap of the adjacent carriers.

What is claimed is:

1. A method for transmitting a digital data stream comprising the steps of:
   splintering the data stream into sub-streams;
   creating a numerical representation of a plurality of carriers modulated according to the sub-streams;
   transforming the numerical representation into a time-domain sample set;
   replicating the time-domain sample set to result in a time-aliased filtering window;
   weighting each replica of the time-domain sample set comprising the filtering window according to a window filtering coefficient;
   adding the weighted filtering window to a previously generated output window;
   converting the time-domain sample set in a first-in-time position in the output window into an analog signal; and
   shifting the output window toward the first-in time position by inserting a zero value time-domain sample set into the last-in-time position of the output window.

2. The method of claim 1 further comprising the step of converting the shifted output from the output window into an analog signal.

3. The method of claim 1 wherein the step of creating a numerical representation of a plurality of carriers modulated according to the sub-streams comprises the steps of:
   creating a frequency-domain representation of a carrier;
   adjusting the frequency-domain representation of the phase of the carrier according to a sub-stream of data; and
   adjusting the frequency-domain representation of the amplitude of the carrier according to a sub-stream of data.

4. The method of claim 1 wherein the step of transforming the numerical representation into a time-domain sample set comprises the steps of:
   accepting K complex samples of a modulated carrier; and
   applying a K-point inverse Fourier transform function to the K complex samples.

5. The method of claim 1 wherein the step of weighting each replica of the time-domain sample set comprising the filtering window according to a window filtering coefficient comprises the steps of:
   establishing window filtering coefficients corresponding to each replica of the time-domain sample set that collectively result in a root-raised-cosine filter; and
   multiplying each replica of the time-domain sample set by the corresponding filtering coefficient.

6. A method for receiving a digital data stream comprising the steps of:
   converting an analog signal into digital samples;
   organizing the digital samples into a filtering window;
   weighting the filtering window by multiplying the filtering window by a filter coefficient;
   of fragmenting the weighted filtering window into sample sets;
   summing together the sample sets;
   transforming the sum of the sample sets into a frequency-domain numerical representation of a plurality of modulated carriers;
   extracting sub-streams of data from each of the plurality of modulated carriers; and
   combining the sub-streams of data to form the digital data stream.

7. The method of claim 6 wherein the step of
   weighting the filtering window by multiplying the filtering window by a filter coefficient comprises the steps of:
   receiving a filter coefficient that defines a root-raised-cosine filter response; and
   multiplying the filtering window by the filter coefficient.

8. The method of claim 6 wherein the step of fragmenting the weighted filtering window into sample sets comprises the step of:
   fragmenting the weighted filtering window into K number of sample sets wherein K is equal to the number of sample points provided to a Fourier transform used to transform the sample sets into a frequency-domain representation of a modulated carrier signal.

9. The method of claim 6 wherein the step of transforming the sum of the sample sets into a frequency-domain numerical representation of a plurality of modulated carriers comprises the steps of:
   accepting K samples comprises a sample set;
   applying a Fourier transform to said K samples.

10. A data transmitter comprising:
    splintering unit that receives a stream of digital data and generates a plurality of sub-streams of data;
    encoder that receives the sub-streams of data and creates a numerical representation of a plurality of carriers modulated according to the substreams of data;
    transformation unit that transforms the numerical representation of a plurality of modulated carriers into a time-domain sample set;
    replicator that creates copies of the time-domain sample set;
    filtering window register that accepts the copies of the time-domain sample set;
    multiplier that receives the copies of the time-domain sample set and multiplies each copy by a pre-established corresponding coefficient to generate a weighted waveform;
    weighted waveform register that receives the resulting weighted waveform from the multiplier;
    adder that sums the value stored in an output register to the value stored in the weighted waveform register and stores that sum back into the output register; and
    output register that receives a sum from the adder and shifts out a time domain sample set corresponding to the first-in-time position of the output register and inserts zeros into the last-in-time position of the output register.

11. The data transmitter of claim 10 further comprising a digital to analog converter that receives a time-domain sample set shifted out of the output register and generates an analog signal according to said time-domain sample set.

12. The data transmitter of claim 10 wherein the encoder comprises a quadrature-phase modulator that:
    creates a frequency-domain representation of a carrier signal;
    adjusts the frequency-domain representation of the phase of the carrier signal according to the sub-stream of data; and
    adjusts the frequency-domain representation of the amplitude of the carrier signal according to the sub-stream of data.

13. The data transmitter of claim 10 wherein the transformation unit comprises a digital processor that implements an inverse Fourier transform capable of accepting K samples representing a modulated carrier and generates time-domain sample set from said K samples.

14. The data transmitter of claim 10 wherein the coefficient used to weight the time-domain sample set results in a root-raised-cosine filter.

15. A data receiver comprising:
   analog to digital converter that receives an analog signal and generates digital samples thereof;
   filtering window that receives the digital samples;
   multiplier that generates a product from the value stored in the filtering window and a pre-established weighting coefficient;
   fragmentation unit that accepts the product from the multiplier and fragments the product into sample sets;
   adder that receives sample sets from the fragmentation unit and generates a sum of said sample sets;
   transformation unit that receives the sum of the sample sets and generates a frequency-domain numerical representation of a plurality of modulated carriers;
   decoder that extracts sub-streams of data from each of the plurality of modulated carriers; and
   combiner that receives the sub-streams of data and creates a digital data stream there from.

16. The data receiver of claim 15 wherein the pre-established weighting coefficients define a root-raised-cosine filter response.

17. The data receiver of claim 15 wherein the fragmentation unit fragments the product into sample sets of K samples wherein K is equal to the number of points provided to a Fourier transform used to transform a sum of the sample sets into a frequency-domain representation of a modulated carrier.

18. The data receiver of claim 15 wherein the transformation unit comprises a signal processor that implements a Fourier transform that accepts K samples and generates a frequency domain representation of the plurality of modulated carriers in K samples.

* * * * *

UNITED STATES PATENT AND TRADEMARK OFFICE
CERTIFICATE OF CORRECTION

PATENT NO. : 7,724,637 B2 Page 1 of 1
APPLICATION NO. : 10/422070
DATED : May 25, 2010
INVENTOR(S) : Steven H. Gardner It is certified that error appears in the above-identified patent and that said Letters Patent is hereby corrected as shown below:

Col. 29, line 65, please delete "of".

Signed and Sealed this

Thirteenth Day of July, 2010

David J. Kappos
*Director of the United States Patent and Trademark Office*